Feb. 14, 1939.  E. E. HEWITT  2,147,295
BRAKE EQUIPMENT
Filed Aug. 23, 1934   4 Sheets-Sheet 1

INVENTOR
ELLIS E. HEWITT
BY
Wm M Cady
ATTORNEY

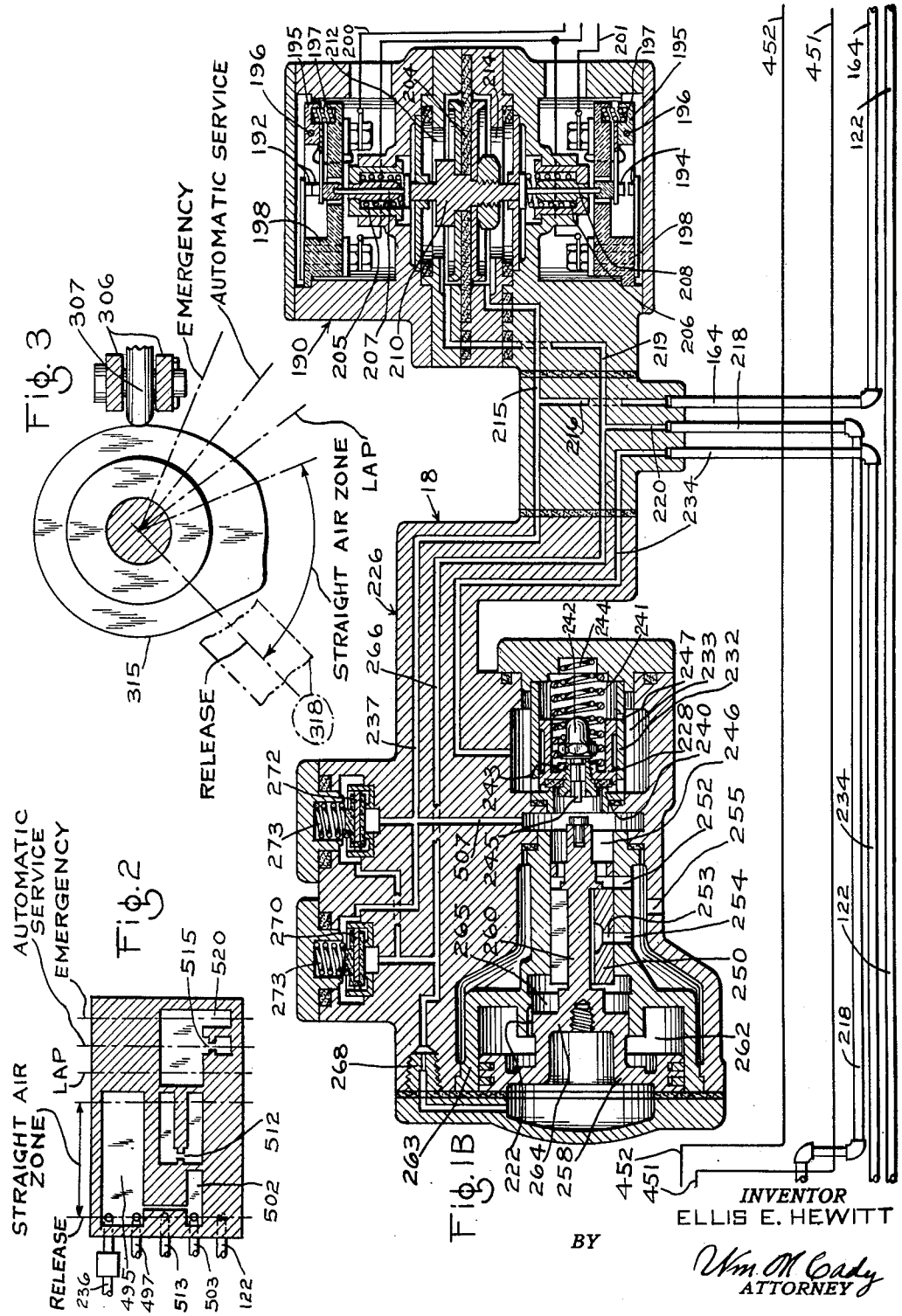

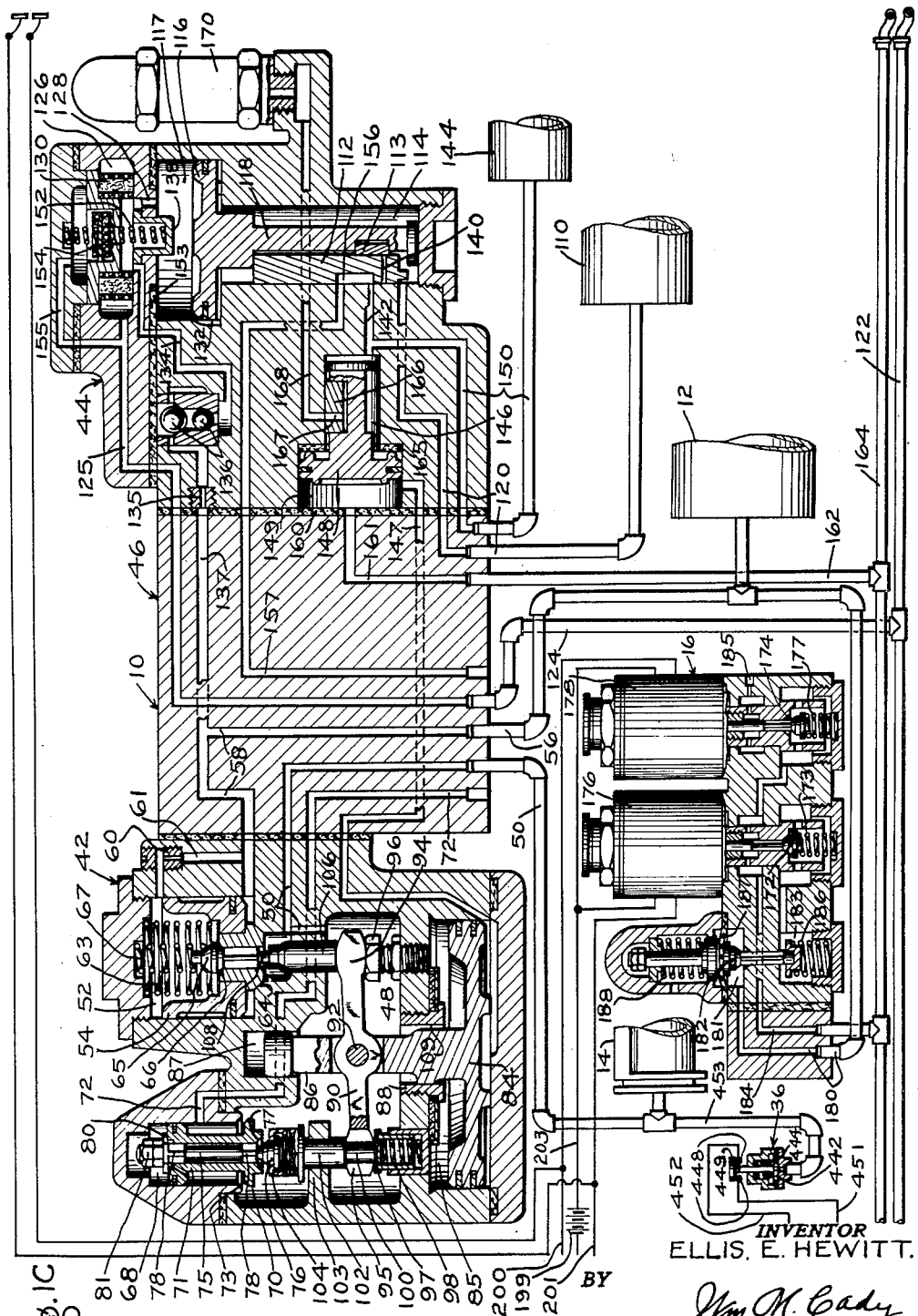

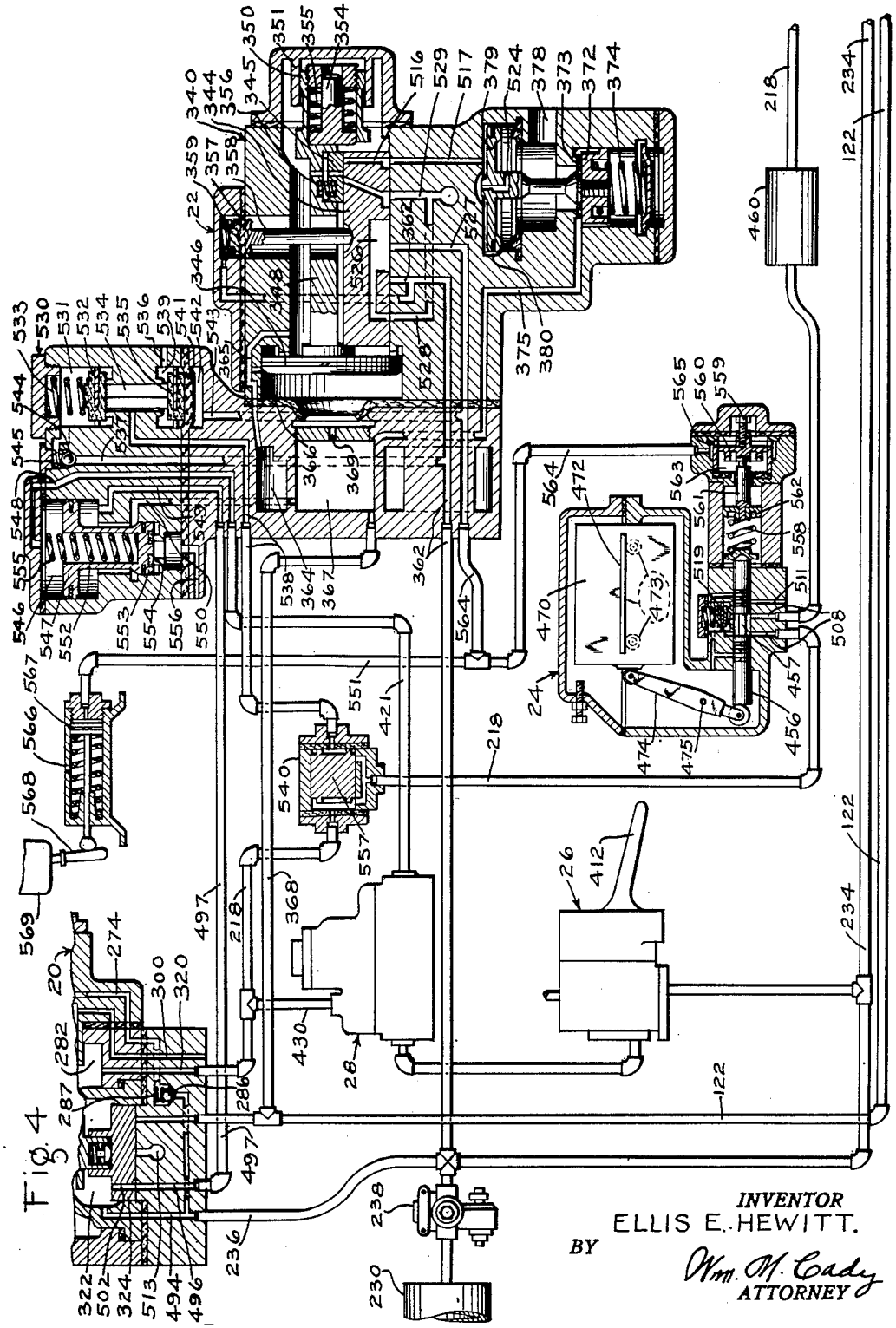

Patented Feb. 14, 1939

2,147,295

UNITED STATES PATENT OFFICE 2,147,295

BRAKE EQUIPMENT

Ellis E. Hewitt, Edgewood, Pa., assignor to The Westinghouse Air Brake Company, Wilmerding, Pa., a corporation of Pennsylvania Application August 23, 1934, Serial No. 741,063

50 Claims. (Cl. 303—15)

This invention relates to brake equipments, and more particularly to brake equipments for high speed railway trains and traction vehicles.

Modern conditions require that railway trains and traction vehicles be operated at relatively high speeds. When such trains and vehicles are operated at high speeds, a braking equipment must be provided which combines a high degree of reliability with flexibility of control, so that the train or vehicle can be handled with the utmost regard for safety. The principal object of the present invention is to provide a braking equipment which is particularly adaptable for use in connection with trains and vehicles to be operated at high speeds.

In order to bring a train or traction vehicle traveling at a high rate of speed to a stop in a short length of time, it is desirable that a high retarding force be initially applied, and that the retarding force be maintained at the highest permissible degree until the train or vehicle is brought to a stop. The braking system must therefore be adapted to effect an application of the brakes in a minimum length of time and with an initial high degree of braking force. In a similar manner, the brakes must be capable of being released quickly, in order to provide for a high degree of flexibility in handling of the train or vehicle. In carrying out my invention, I contemplate a braking equipment providing for both fast application and fast release of the brakes, and providing for effecting high initial braking forces so as to immediately start deceleration of the train or vehicle.

In order that the braking system shall be thoroughly reliable and shall not be rendered ineffective upon the occurrence of possible faults therein, it is highly desirable that provision be made for effecting an application of the brakes by more than one mode of operation. Accordingly, it is a further object of my invention to provide a braking system in which an application of the brakes may be effected either by straight air operation or by automatic operation, both methods being well known in the art and having been proven reliable by many years of service.

While reliability of operation of the braking equipment is of paramount importance, it is of high practical importance that the means for controlling applications of the brakes by the operator, whether effected by straight air operation or by automatic operation, should require only the simplest manipulative acts on the part of the operator. In this connection, it is a yet further object of my invention to provide a control device in the form of a brake controlling valve device which is operative to control both straight air and automatic operation of the brakes by the simple manipulation of a handle or control element.

It is a yet further object of the invention to provide a braking equipment in which service applications of the brakes are normally effected by straight air operation, and in which the degree of application of the brakes during such service applications is effected in accordance with the degree or extent of movement of the brake controlling valve device handle; and in which emergency applications of the brakes are normally effected by both straight air and automatic operation, in response to a certain movement of the same brake valve handle; and in which service applications of the brakes may be also effected solely by automatic operation upon failure of straight air operation, in response to a yet different movement of the same brake valve handle.

If when the brake valve handle is moved a predetermined extent or degree to effect a predetermined degree of braking in effecting a service application of the brakes, the equipment should fail to respond to effect this desired degree, then it is desirable that means be provided for effecting an emergency application of the brakes, otherwise the train or vehicle may not be brought to a stop in the desired length of time. It is therefore a still further object of my invention to provide means for effecting an emergency application of the brakes upon failure of the equipment to respond in a chosen length of time to effect a degree of application of the brakes corresponding to the movement of the brake valve handle to certain positions in the service application zone.

It is well known that in brake equipments employing friction type brakes, such as clasp type brakes operating upon the rim of the vehicle wheels, the coefficient of friction between the brake shoes and vehicle wheels is greater at the lower speeds than at the higher speeds. As a consequence, when the brakes are applied with a high degree of braking force at high speeds, the braking force must be diminished as the train or vehicle speed diminishes, because as the coefficient of friction increases with diminishing vehicle speed, the increased braking effect on the wheels may cause them to slide. Wheel sliding is undesirable in that flat places are worn on the wheels, rendering them unfit for regular service, and in that the retarding effect of the brakes is greatly reduced when the wheels slide. Heretofore, in order to prevent wheel sliding, the operator has usually diminished the braking force by manual manipulation of the brake valve handle. It is however desirable that some automatic means be provided for diminishing the braking force as the speed of the vehicle diminishes. One manner of accomplishing this is to decelerate the train or vehicle at a fixed rate of retardation. It is therefore yet another object of my invention to provide means for controlling the rate of retardation of the vehicle or train, so that the train or vehicle is decelerated at predetermined rates, the maximum of which is just below that which will produce sliding of the wheels. With such means as I propose to provide, it becomes unnecessary for the operator to manipulate the brake valve handle other than in effecting an initial application of the brakes, and at the very end of the stop where some manipulation is desirable in order to bring the train or vehicle to a smooth stop.

A still further object of the invention is to provide a braking equipment including the safety feature commonly referred to as "deadman control".

Yet another object of the invention is to provide a novel arrangement of special equipment for generally carrying out the objects above set forth.

Other objects and advantages of the invention will be apparent from the following description, which has been illustrated in the attached drawings, wherein.

Figures 1A, 1B and 1C, taken together, illustrate one embodiment of my invention, intended principally for a railway train.

Figure 2 is a diagrammatic representation of operation of the brake controlling valve device shown to the upper left in Figure 1A.

Figure 3 is a view along the line 3—3 of this same brake valve device, showing in outline form an operating cam therein.

Figure 4 is a modified form of the equipment shown in Figure 1A. The equipment and arrangement shown in Figure 4 may replace that shown in Figure 1A, and thus operate with the equipment shown in Figures 1B and 1C as a complete train braking equipment.

Figure 1A:
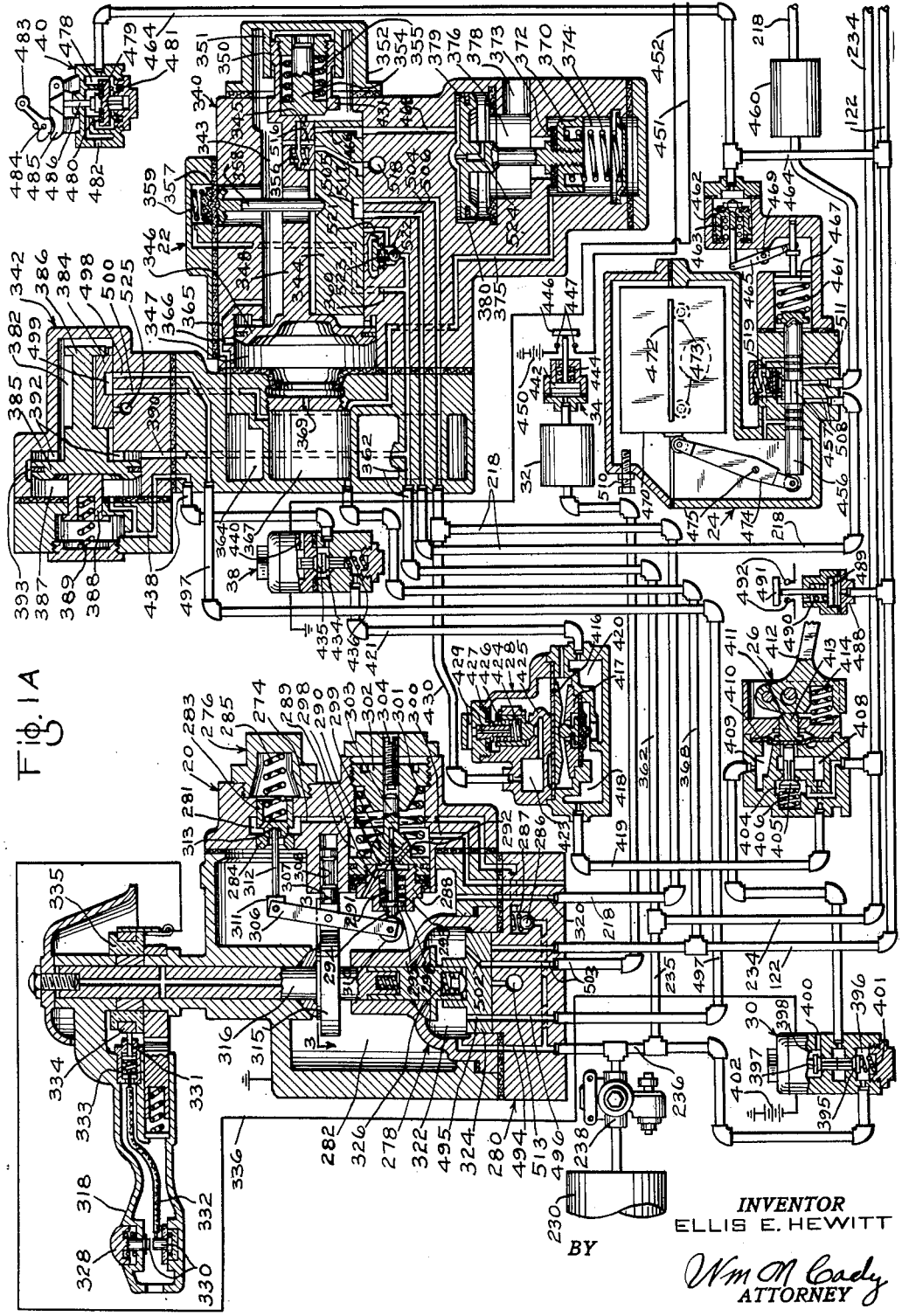

In the embodiment shown in Figures 1A, 1B and 1C, taken together, there has been illustrated an equipment for only the head end or control car of the train. However, it is to be understood that the apparatus shown in Figure 1C is to be duplicated on each car in the train, so that when so considered the equipment shown in these three figures actually constitutes that for an entire train. For the purposes of this description, the equipment will be treated as applying to only one car, but the invention will be claimed both as applying to one car and to a train comprising a plurality of cars.

Considering briefly at first the embodiment illustrated in Figures 1A, 1B and 1C, there has been provided a control valve device 10, which includes a relay valve section and a triple valve section. The relay valve section, shown to the left, controls all flow of fluid under pressure from a supply reservoir 12 to a brake cylinder 14 (or a plurality of such brake cylinders), whether the application of the brakes is effected by straight air operation, by automatic operation, or by both. The triple valve section, shown to the right, of this control valve device is operative only during automatic operation of the brakes, and during automatic operation controls operation of the aforementioned relay valve section. Shown below the control valve device 10 is a magnet valve mechanism 16, which is operative only during straight air operation of the brakes to control operation of the aforementioned relay valve section.

As already explained, there will be provided a control valve device 10 and a magnet valve mechanism 16 on each car in the train, and for controlling these devices from the head end or control car I have provided a master control mechanism 18. This mechanism is intended to be operative only during straight air operation of the brakes.

For controlling the aforementioned apparatus in effecting normal service and emergency application of the brakes, whether effected by straight air operation or by automatic operation, I have provided a brake controlling valve device 20.

In order that the brakes may be applied by both straight air operation and automatic operation during emergency applications, I have provided an emergency valve device 22.

In order to limit the rate of retardation produced by an application of the brakes to a value which will not cause wheel sliding, I have provided a retardation controller device 24.

To provide the well known "deadman" safety feature in the equipment, I have included a foot valve device 26, a cut-off valve device 28, and a magnet valve device 30.

In order that an emergency application of the brakes shall automatically be effected upon failure of the equipment to respond to a predetermined movement of the brake valve handle when effecting a service application of the brakes by straight air operation, I have provided a timing reservoir 32, pneumatic switch devices 34 and 36, and a magnet valve device 38.

For effecting an emergency application of the brakes from points other than at the brake valve, I have provided a conductor's valve device 40. While only one of these valve devices has been shown, as in Figure 1A, it is to be understood that there may be provided one of these devices on each car or vehicle in the train, as desired.

Considering now more in detail the apparatus and devices just referred to, the control valve device 10, as shown, comprises a relay valve section 42, a triple valve and double check valve section 44, and a pipe bracket section 46.

The relay valve section 42 is provided with a pressure chamber 48, which is in constant communication with the brake cylinder 14, by way of pipe and passage 50. Disposed in a valve chamber 52 in this section is a supply valve 54, which controls the supply of fluid under pressure from the supply reservoir 12 to the pressure chamber 48, and hence to the brake cylinder 14. The portion of the valve chamber 52 below the slidable valve body, is in communication with the supply reservoir 12 by way of pipe 56 and passages 58. The portion of the valve chamber 52 above the valve body is also in communication with the supply reservoir by way of a choke 60 and a passage 61.

The supply valve 54 is urged toward a seat 64 by a spring 63. Disposed within the supply valve 54 is a pilot valve 65 urged toward a seat 66 by a spring 67.

The relay valve section 42 is also provided with a release valve chamber 68, in which is disposed a release valve 70. The release valve chamber 68 is in constant communication with the atmosphere by way of passage 72. When the release valve 70, and its body 71 which slides in the valve chamber 68, are actuated downwardly, the valve moves away from its seat 73 to connect the pressure chamber 48 to the atmosphere, by way of valve chamber 68 and passage 72.

Disposed in an aperture in the release valve body 71 is a valve stem 75 of a diameter slightly less than that of the aperture through the body 71. Secured to the lower end of the stem 75 is a release pilot valve 76. The valve stem 75 is movable longitudinally of the body 71, so that the pilot valve 76 may be urged upwardly toward its seat 77.

Either end of the valve stem 75 is fluted, as at 78, and the upper end of the stem has secured thereto a split ring 80, held in place by nuts 81, so that fluid under pressure may flow past seat 77 and upwardly past the split ring 80 into that portion of valve chamber 68 above the body 71. The purpose of this arrangement will appear presently.

For actuating the release valve 70 to seated position, and for effecting unseating of the supply valve 54, there is provided a mechanism operated by a piston 84 disposed in a piston chamber 85. The piston 84 has integral therewith a stem 86, one end of which is slidably disposed in a bore 87, and the other end adjacent the piston 84 being slidably disposed in a bushing 88 carried by a wall defining the piston chamber 85.

Intermediate its ends, the piston stem 86 is slotted to receive a lever 90, which is pivotally mounted at 92 in the slot in the piston stem. To either side of the fulcrum 92 the lever 90 is provided with bifurcated ends 94 and 95. In the lowermost position of the piston 84, the right end 94 of the lever 90 is adapted to rest upon an adjustable stop 96, while the left end 95 rests in the position shown, against opposition of a spring stop 97, urged upwardly by a spring 98.

The left end 95 receives between its bifurcations a shank portion 100 of a plunger 102, which is slidably carried by a lug 103 projecting from the relay valve section casing. The aforementioned release pilot valve 76 is secured to the upper end of the plunger 102 by a sleeve 104, which grips a flange on the release pilot valve as the sleeve is screwed onto a threaded end of the plunger.

The right end 94 of the lever 90 also carries a plunger 106, which is slidable in a portion of the relay valve housing, and which has its upper end adapted to engage a fluted stem 108 associated with the aforementioned supply pilot valve 65.

The piston 84 is adapted to remain in its lowermost position, as shown in Figure 1C, when the brakes are released, and to be actuated upwardly by the supply of fluid under pressure therebelow when effecting an application of the brakes. When the piston 84 moves upwardly the lever 90 pivots about its right end 94, against plunger 106, which is held downwardly by action of the spring 67, and the left end 95 moves upwardly to first seat the release pilot valve 76 and subsequently the main release valve 7.

When the main release valve has been seated, the lever 90 fulcrums about its left end 95 and the right end 94 is actuated upwardly to unseat the supply pilot valve 65. When this pilot valve is unseated fluid under pressure in the valve chamber 52 above the valve 54 flows past the unseated pilot valve 65 to the pressure chamber 48. This release of pressure above the supply valve 54 unloads the valve, so that when the upper end of the plunger 106 engages the lower edge of the supply valve 54 it will be unseated at a much lower pressure than before being unloaded. The choke 60 restricts the flow of fluid under pressure to the space above the valve during this operation, so that the unloading is effectively accomplished. The supply valve will therefore be unseated quickly.

When the main supply valve 54 is thus unseated, fluid under pressure flows from the supply reservoir 12 to the pressure chamber 48, and from thence to the brake cylinder 14, by way of the passages heretofore described. Fluid under pressure in the chamber 48 also flows to the piston chamber 85 above the piston 84, by way of leakage groove 109, until the pressures above and below the piston 84 are substantially equal. When this takes place the piston 84 moves downwardly until the main supply valve 54 and pilot valve 65 are seated. The supply of fluid under pressure to pressure chamber 48, and the brake cylinder 14, is then lapped.

When the pressure beneath piston 84 is reduced, as when released to the atmosphere, piston 84 moves further downwardly to unseat the release pilot valve 76. When this pilot valve is unseated, fluid under pressure in the pressure chamber 48 flows past the unseated release pilot valve and on either side of the valve stem 75 to the portion of the release valve chamber 68 above the body 71. Pressure in this portion of the release valve chamber will then exert a downward force on the body 71 corresponding to the upward force exerted on the main release valve 70 from the pressure chamber 48. The release valve is then unloaded, so that as the left end 95 of the lever 90 moves downwardly, the release valve 70 will be unseated, to release fluid under pressure from the pressure chamber 48 to the atmosphere, by way of passage 72.

Considering now the triple valve and double check valve section 44 of the control valve device 10, the triple valve functions during automatic operation to effect a supply of fluid under pressure from an auxiliary reservoir 110 to the under side of the relay piston 84, while the double check valve functions to select between automatic operation and straight air operation, or to isolate the one when the other is effective, as will appear presently.

The triple valve may comprise a main slide valve 112 and a graduating valve 113, disposed in a valve chamber 114. A piston 116, disposed in a piston chamber 117, is provided for operating the two slide valves. The piston 116 may be provided with a stem 118, which is adapted to move the graduating valve 113 according to movement of the piston 116, and to actuate the main slide valve 112 after a predetermined movement or lost motion of the piston 116.

The slide valve chamber 114 is connected to the auxiliary reservoir 110 by way of pipe and passage 120. The piston chamber 117 is connected to a brake pipe 122, which of course extends throughout the train, by way of pipe 124, passage 125, strainer chamber 126 and port 128.

Disposed in the strainer chamber 126 is an annular strainer device 130, preferably of the curled hair type, which is adapted to strain all fluid under pressure flowing from the brake pipe to the piston chamber 117. When fluid under pressure in the brake pipe 122, and piston chamber 117, is maintained at a predetermined value, the piston 116 will remain in its lowermost position, as shown in Figure 1C. In this position the auxiliary reservoir 110 will be charged from the brake pipe by way of the leakage groove 132 around the piston 116. At the same time, the supply reservoir 12 will be charged from the brake pipe by way of passage 134, ball check valves 136, choke 135, passages 137 and 58, and pipe 56. The two ball check valves 136 prevent back flow from the supply reservoir to the brake pipe, while the choke 135 limits the rate of supply of fluid to the supply reservoir.

When the pressure in the brake pipe is gradually reduced, at a service rate, the overbalancing pressure acting beneath the triple piston 116 urges the piston upwardly until it engages a graduating stem or stop 138, where the piston stops. In this position the graduating valve 113 uncovers a port 140 in the main slide valve 112, and the main slide valve brings this port into registration with a passage 142 in the valve seat, to supply fluid under pressure from the auxiliary reservoir 110 at a service rate to the under side of relay piston 84 and to a volume reservoir 144. The flow to the under side of the relay piston passes through slide valve chamber 146, and passage 147, double check valve piston 148 in double check valve piston chamber 149 being urged to the left to uncover the passage 147, and the flow to the volume reservoir 144 is by way of pipe and passage 150.

When the pressure in the brake pipe is suddenly reduced, at an emergency rate, the triple piston 116 overcomes the resistance of spring 152 behind the graduating stop 138 and the piston moves upwardly until it is in engagement with the gasket 153. In this position the end of the main slide valve 112 uncovers the passage 142, so that fluid under pressure flows from the auxiliary reservoir to both the under side of relay piston 84 and the volume reservoir 144 at an emergency rate.

If when the brake pipe pressure is reduced, the strainer device 130 should be so clogged as to prevent the passage of fluid therethrough, then the overbalancing pressure in the triple piston chamber 117 will unseat a spring loaded check valve 154 and fluid will then flow from the piston chamber to the brake pipe by way of a by-pass passage 155. An application of the brakes may thus be effected even though the strainer device will not pass fluid therethrough.

When the pressure in the brake pipe is restored, the triple piston 116 will move to its lowermost position, as shown, whereupon graduating valve 113 will blank port 140, and the main slide valve 112 will connect the volume reservoir 144 and the under side of relay piston 84 to the atmosphere, by way of cavity 156 and passage 157.

When the double check valve piston 148 is moved to the left, as just described, it moves into sealing engagement with a gasket 160, so as to prevent leakage past the piston to a passage 161, which by way of branch pipe 162 leads to a straight air pipe 164. Similarly, when the double check valve moves to the right, it moves into sealing engagement with a gasket 165, so as to prevent leakage past the piston to the chamber 146.

When the double check valve piston 148 is moved to the right, it actuates a slide valve 166, carried by the stem of the piston, to a position where a port 167 therein is in registration with a passage 168 leading to a safety valve device 170. The safety valve device 170 may be of any of the well known types, the function of which, as is well known in the art, is to release the pressure from the volume to which it is connected down to a predetermined value and thereafter to retain this predetermined pressure in the volume. When the piston 148 is actuated to the left, slide valve 166 blanks passage 168. The purpose of this arrangement will appear more fully hereinafter in the description of operation of the entire braking equipment.

The magnet valve mechanism 16, which is operative during straight air operation of the braking equipment, includes a supply valve 172 and a release valve 174. The supply valve 172 controls the supply of fluid under pressure from the supply reservoir 12 to the straight air pipe 164, from whence it flows to the under side of relay piston 84, while the release valve 174 controls the release of fluid under pressure therefrom. The supply valve 172 is urged toward seated position by a spring 173 and to unseated position by action of an electromagnet 176, which when energized actuates the valve downwardly. The release valve 174 is urged toward seated position by a spring 177, but is normally held in unseated position by action of an energized electromagnet 178.

When the release valve 174 is seated and the supply valve 172 is unseated, fluid under pressure flows from the supply reservoir 12 through pipe and passage 180, cut-off valve chamber 181, past an unseated cut-off valve 182, to a chamber 183, from whence it flows past the unseated supply valve 172, through passage 184, to the straight air pipe 164. From the straight air pipe 164 the flow is through the branch pipe 162, passage 161, double check valve piston chamber 149, and passage 147 to the under side of relay piston 84. When the supply valve 172 is seated, and the release valve 174 is unseated, pressure in these volumes is released to the atmosphere, past the unseated reelase valve 174 and by way of exhaust port 185.

In order to prevent a total loss of pressure in the supply reservoir 12 in case the supply valve 172 should be unseated at the same time the release valve 174 is unseated, or in case there should be a broken pipe line between the magnet valve mechanism and the apparatus it supplies fluid under pressure, or in case of other faults, I have included a cut-off valve device in the magnet valve mechanism.

This cut-off valve device includes the aforementioned cut-off valve 182, which is urged toward unseated position by the combined action of a spring 186 and fluid pressure acting beneath a diaphragm 187, the two acting against opposing pressure of a spring 188. When the fluid pressure beneath diaphragm 187 drops to a predetermined value where the combined pressures acting on the under side of the diaphragm are less that of the spring 188 acting above the diaphragm, then the cut-off valve 182 is seated to isolate the supply reservoir 12 from the magnet valve mechanism. The fluid pressure at which the cut-off valve 182 seats is chosen as below that which obtains in the supply reservoir following a full service application of the brakes.

In the magnet valve mechanism, energization of the electromagnets 176 and 178 is controlled by a pneumatic switch portion 190 of the master control mechanism 18. This switch portion includes a set of contacts 192 for controlling energization of the release electromagnet 178 and a set of contacts 194 for controlling energization of the supply electromagnet 176. Each set of contacts comprises a stationary contact and a movable contact. Each movable contact is carried by an insulating member 195 pivotally mounted at 196 and urged by a spring 197 in a direction to normally disengage the movable contact from the stationary contact. Each stationary contact is suitably supported from an insulating support 198.

The stationary contact of each set is connected to a terminal of battery 199, while the movable contact of the set 192 is connected to one terminal of the release electromagnet 178, by way of conductor 200, and the movable contact of the set 194 is connected to one terminal of the supply electromagnet 176, by way of conductor 201. The other terminals of the two electromagnets are connected to the opposite terminal of the battery 199, by way of conductor 203.

Opening and closing of the contacts 192 and 194 is accomplished by movement of a pressure actuated diaphragm 204. The diaphragm 204 is normally positioned in a neutral position by springs 205 and 206 acting upon plungers 207 and 208, respectively, which in turn engage a member 210 secured to the diaphragm.

The diaphragm and casing supporting the diaphragm are arranged such that a chamber 212 is formed above the diaphragm and a chamber 214 below the diaphragm. The chamber 214 below the diaphragm is connected to the aforementioned straight air pipe 164, by way of passages 215 and 216. The chamber 212 above the diaphragm is connected to a control pipe 218, the purpose of which is more fully hereinafter set forth, by way of passages 219 and 220.

When the diaphragm 204 is in its neutral position, release magnet valve contacts 192 are closed, so that release electromagnet 178 is energized, and supply magnet valve contacts 194 are opened, so that supply electromagnet 176 is deenergized. When fluid under pressure is supplied to the upper chamber 212, the diaphragm 204 is actuated downwardly to permit release contacts 192 to open, and thereby cause seating of the release valve 174, and to close supply contacts 194, thereby causing unseating of the supply valve 172.

As before described, unseating of the supply valve 172 effects a supply of fluid under pressure from the supply reservoir 12 to the straight air pipe 164. Fluid under pressure in the straight air pipe 164 flows to the bottom chamber 214, and when the pressure in this chamber 214 has reached a value differing from that in chamber 212 by a predetermined amount, the diaphragm moves upwardly far enough to permit supply contacts 194 to open. Opening of these contacts causes seating of the supply valve 172, thus lapping the supply of fluid to the bottom chamber 214.

If the pressure in the bottom chamber 214 should equal or exceed the pressure in the upper chamber 212, then release contacts 192 will be closed, and the release valve 174 will be unseated to release fluid pressure from the bottom chamber 214. The full purpose of this pneumatic switch portion will appear presently.

The master control mechanism 18 also includes a master relay valve portion 226, which is provided with a supply valve 228, for controlling the supply of fluid under pressure from a feed valve device 238 to the lower chamber 214 and straight air pipe 164. The supply valve 228 is slidably disposed in a bushing 232 mounted in a supply chamber 233. The supply chamber 233 is connected to the feed valve device 238 by way of pipe and passage 234, and pipes 235 and 236. The feed valve device 238 is connected to a main reservoir 230 and functions to maintain a substantially constant pressure in the pipe and volumes connected thereto. This feed valve device, which is a well known device in the art, may be of any of the types commonly employed. For convenience, flow of fluid from the main reservoir will hereinafter be referred to as flow from the feed valve device.

The supply valve 228 is urged toward a seat 240 by a spring 241. Disposed within the supply valve is a pilot supply valve 242, which is urged toward a seat 243 by a spring 244. The supply pilot valve 242 has a stem 245 projecting outwardly beyond the main supply valve 228.

When the pilot valve stem 245 is actuated to the right to unseat the pilot valve 242, fluid pressure to the right of the main supply valve 228 is released to a slide valve chamber 246, so that the main supply valve 228 is unloaded. The main supply valve may then be unseated with a relative low pressure applied to its end to supply fluid under pressure from the feed valve device 238 to the slide valve chamber 246. The portion of the chamber to the right of the main supply valve 228 is connected to the supply chamber 233 by way of a restricted port 247, so that the pressure builds up to the right of the valve at a rate which will not prevent unloading of the main supply valve.

Disposed in the slide valve chamber 246 is a slide valve 250, which controls the release of fluid under pressure from the slide valve chamber 246 to the atmosphere. When the slide valve 250 is in the position shown in Figure 1B, the slide valve 250 uncovers a port 252 and brings its port 253 into registration with a seat port 254, to connect the slide valve chamber 246 with the atmosphere, by way of an exhaust port 255. When the slide valve 250 is actuated to the right, this communication to the atmosphere is cut off.

For actuating the slide valve 250 to the right and for unseating the supply valves, there is provided a piston 258 having a stem 260 for actuating the slide valve 250, and for engaging the pilot valve stem 245 and the main supply valve 228. The piston 258 is disposed in a piston chamber 262 which is in communication with the slide valve chamber 246 by groove 222 in a bore 265 in a wall 263, the piston stem 260 being provided with an enlarged portion 264 interfitting with the bore 265.

The piston 258 is actuated to the right by the supply of fluid under pressure to the left side thereof. The portion of the piston chamber 262, to the left of piston 258, is connected to the aforementioned control pipe 218 by way of passage 266 and a choke 268.

In the upper portion of the master relay valve there are provided two check valves 270 and 272. Each of the two check valves is urged to a seated position by a spring 273. The check valve 270 is adapted to permit the flow of fluid from the passage 266 to the passage 237 upon a predetermined differential of pressure therebetween, while the check valve 272 is adapted to permit the flow of fluid from the passage 237 to the passage 266 upon a similar predetermined differential of pressure therebetween.

The supply of fluid under pressure to the master relay valve and pneumatic switch portion of the master control mechanism 18, by way of control pipe 218, is effected by operation of the brake controlling valve device 20. This valve device comprises a self-lapping valve section 276, a rotary valve section 278, and a pipe bracket section 280. These sections assembled together define a pressure chamber 282.

The self-lapping section 276 is provided for effecting and controlling application of the brakes during straight air operation. This section is provided with a valve chamber 281 in which is disposed a supply valve 283, urged toward a seat 284 by a spring 285. The valve chamber 281 is in communication with the feed valve 238 by way of passage 274 and the aforementioned pipe 236. A check valve 286, held seated by a spring 287, is disposed in the passage 274, for a purpose which will appear later.

The self-lapping valve section is also provided with a chamber 289 in which is operatively mounted a movable abutment 288 in the form of a piston, which contains interiorly thereof a release valve chamber 290. Disposed in the release valve chamber 290 is a release valve 291, which is urged away from a seat 292 by a spring 293. The release valve 291 has an extended stem 294 provided with an annular shoulder 295 for engaging a flange 296 on the movable abutment, to limit the travel of the release valve to the left.

The release valve chamber 290 is in communication with the pressure chamber 282 through a passage 298 in the movable abutment. Passages 299 lead from the opening through the valve seat 292 to that portion of the chamber 289 to the right of the movable abutment 288, and this portion of the chamber 289 is in communication with the atmosphere by way of passage 300.

The movable abutment 288 is subject on one side to fluid pressure in the pressure chamber 282 and on the other side to the pressure of a regulating spring 301. Tension on the spring 301 is regulated by a regulating member 302, which has a bore therein for receiving a guiding plunger 303 integral with the movable abutment. An adjusting screw 304 is provided for regulating movement of the movable abutment to the right.

It will thus be seen that the supply valve 283 controls the supply of fluid under pressure to the pressure chamber 282, and the release valve 291 controls the release of pressure therefrom to the atmosphere.

For operating the supply valve 283 and the release valve 291, there is provided a mechanism including spaced levers 306 carried intermediate their ends by a movable pivot carrier 307 slidably interfitting with a bore 308 in the self-lapping valve section casing. Rotatably disposed between the lower ends of the spaced levers 306 is a roller 310, which is adapted to engage the extended stem 294 of the release valve 291. Loosely held between the upper ends of the spaced levers 306, is a member 311 carrying a rod 312 having one end thereof disposed in a recess 313 in the supply valve 283.

The spaced levers 306 are intended to effect a seating of the release valve 291 and an unseating of the supply valve 283 when the movable pivot carrier 307 is actuated to the right. For actuating the pivot carrier 307 to the right, there is provided a cam 315, secured to an operating shaft 316, which shaft is adapted to be rotated by movement of a handle 318. As shown in Figure 3, the cam 315 has a configuration such that when the shaft 316, and the handle 318, are rotated in a counterclockwise direction through the zone marked "Straight Air Zone" the pivot carrier 307 is actuated to the right various distances, as will hereinafter more fully appear.

Movement of the pivot carrier 307 to the right carries with it the spaced levers 306. Now the supply valve spring 285 offers a greater resistance than the release valve spring 293, and the regulating spring 301 offers a greater resistance than either of these two springs. Therefore, upon movement of the pivot carrier 307 to the right, the spaced levers 306 fulcrum about their upper ends to first cause seating of the release valve 291. The regulating spring 301 then offers a resistance such that the spaced levers 306 fulcrum about their lower ends, so that the upper ends of the spaced levers move to cause unseating of the supply valve 283. During this movement of the pivot carrier 307, the regulating spring 301 is unappreciably compressed.

With seating of the release valve 291 and unseating of the supply valve 283, fluid under pressure is supplied from the feed valve 238 to the pressure chamber 282. The pressure chamber 282 is in constant communication with the control pipe 218 by way of passage 320, so that fluid flows through this control pipe to the master control mechanism 18, by way of the emergency valve device 22 and the retardation controller device 24, as will more fully appear presently.

As the pressure in the pressure chamber 282 rises it will compress the regulating spring 301, and when this spring has been compressed sufficiently the lower ends of the spaced levers 306 will move to the right and the upper ends will move to the left, thereby permitting supply valve 283 to seat. A little thought will show that if the pivot carrier 307 is actuated to the right a given distance after the release valve 291 is seated the supply valve 283 will be unseated a proportional distance. Therefore, the pressure required in the pressure chamber 282 to effect seating of the supply valve by movement of the movable abutment to the right, will likewise be proportional to this distance.

When the supply valve 283 is seated, the supply of fluid to the control pipe 218 is lapped, and it will therefore be apparent that the pressure at which this supply laps is governed by the degree of movement of the pivot carrier 307 to the right, and hence according to the degree of movement of the handle 318. The degree of pressure established in the pressure chamber 282 then corresponds to the degree or extent of movement of the brake valve handle 318 through the "Straight Air Zone".

The rotary valve section 278 of the brake valve device comprises a casing defining a rotary valve chamber 322 in which is disposed a rotary valve 324. The rotary valve 324 is held upon a seat in the pipe bracket section 280 by a spring 326 and fluid pressure in chamber 322, and is adapted to be actuated by rotation of the shaft 316, to control ports and passages as will hereinafter more fully appear. The rotary valve chamber 322 is in constant communication with the feed valve device 238, through passage 494 and pipe 236.

The rotary valve section 278 is provided for controlling applications of the brake during automatic operation. Since both the self-lapping valve section and the rotary valve section are operated from the one handle 318, it will be apparent that applications of the brakes, whether by straight air operation or by automatic operation, may be controlled by the simple manipulation of the one brake valve handle. This will more fully appear from the description of operation of the invention, which follows presently.

The brake valve device 20 may have included therein one feature of the "deadman control", in the form of a push button 328 for closing normally open contacts 330. One of these contacts is preferably grounded to the casing of the brake valve device, which is in turn grounded to the frame of the vehicle. The other of these contacts is connected to a brush 331, by conductor 332, the brush 331 being pressed by spring 333 into engagement with a conducting ring 334, which is carried by an insulating member 335 secured to the brake valve body. The ring 334 is connected to the magnet valve device 30 by way of conductor 336. The functioning of this feature of the brake equipment will appear more fully hereinafter.

The emergency valve device 22 is provided for effecting an emergency application of the brakes. The emergency valve device comprises a main portion 340 and an application valve portion 342.

The main portion 340 comprises a casing defining a slide valve chamber 343, in which is disposed a main slide valve 344 and a graduating valve 345. For operating the main and graduating valves there is provided an emergency piston 346, disposed in a piston chamber 347 and having a stem 348 provided with a tail portion 350 slidably interfitting with a sleeve 351 forming a part of an end cap 352 secured to the casing of the main portion 340. Slidably disposed in the tail portion 350 is a tail stop 354, which is urged to a biased position by a spring 355 and which is adapted to engage one end of the main slide valve 344 when the emergency piston 346 moves outwardly to the left.

The piston stem 348 is recessed to receive the graduating valve 345, and the graduating valve is held upon the top of the main slide valve 344 by a spring 356. The main slide valve 344 is held upon its seat by a loading mechanism comprising a flexible diaphragm 357 mounted in the casing of the valve device and adapted to be urged into engagement with a rocking pin 358 bearing upon the main slide valve 344. A spring 359 exerts a constant downward pressure upon the flexible diaphragm 357. The chamber above the diaphragm 357 is connected by passage 360 with pipe and passage 362 leading to the feed valve device 238, so that a fluid pressure corresponding to that supplied by the feed valve device is at all times exerted on the upper side of the flexible diaphragm.

The slide valve chamber 343 is in communication with a quick action chamber 364, formed in the casing of the main portion 340, by way of a passage 365. A port 366 connects the passage 365 with the piston chamber 347, and is adapted to disconnect the quick action chamber 364 from piston chamber 347 to the left of emergency piston 346 when the piston moves from its extreme right hand position to the left.

The emergency piston chamber 347 is in communication with the brake pipe 122 by way of branch pipe 368, a brake pipe chamber 367 and a port 369.

Formed in a lower part of the casing of the main portion 340 is a vent valve chamber 370 in which is disposed a vent valve 372 held upon a seat 373 by a spring 374. The vent valve chamber 370 is in communication with the aforementioned brake pipe chamber 367 by way of a passage 375. The vent valve 372 therefore controls the flow of fluid from the brake pipe chamber 367, and hence the brake pipe 122, to a chamber 376 above the vent valve seat 373, which is in communication with the atmosphere by way of a large port 378.

For operating the vent valve 372 away from its seat, there is provided a vent valve piston 379. When fluid under pressure is supplied to the space above the vent valve piston 379 at a rapid rate, the piston actuates the vent valve 372 to unseated position to release fluid under pressure from the brake pipe chamber 367, and the brake pipe 122, to the atmosphere. When the supply of fluid under pressure to the space above the piston 379 is at a slow rate, it may leak around the piston by way of groove 380, and thus flow to the atmosphere without actuating the piston downwardly to unseat the vent valve.

The main slide valve 344 is adapted to control ports and passages for a purpose and in a manner which will be more fully discussed in the description of operation of this embodiment of my invention.

The application valve portion 342 comprises a casing defining a slide valve chamber 382 in which is disposed a slide valve 384. A piston 385 is provided for actuating the slide valve 384, and a stem 386 integral with the piston 385 is recessed to receive the slide valve 384. The piston 385 is disposed in a piston chamber 387, in which is also suitably mounted a stop 388 urged to a biased position by a spring 389.

The slide valve chamber 382 is in constant communication with the aforementioned pipe and passage 362, leading to the feed valve device 238, by way of passage 390. The piston chamber 387, to the left of piston 385, is also normally in communication with the feed valve device 238, as will appear presently, so that the piston is normally urged to a biased position to the right against the stops 392 by the spring pressed stop 388. A leakage groove 393 is provided for equalizing the pressures on either side of the piston when in this position, to prevent undesired operation. The application valve portion 342 functions to effect an emergency application of the brakes in response to operation of certain of the safety control devices.

The magnet valve device 30, which forms a part of the safety control mechanism, is provided with a supply valve 395 disposed in a supply valve chamber 396, and a release valve 397 disposed in a release valve chamber 398. The supply valve chamber 396 is in constant communication with the feed valve device 238, by way of pipe 236, while the release valve chamber 398 is in communication with the atmosphere by way of port 400.

The supply valve 395 is urged toward seated position and the release valve 397 toward unseated position by a spring 401. These valves are urged to unseated and seated positions, respectively, by action of an electromagnet in the upper part of the valve device casing, which when energized actuates the two valves downwardly. This electromagnet is energized when the aforementioned push button 328 in the handle 318 of the brake valve device 20 is depressed far enough to close contacts 330. Closing of these contacts supplies current to this electromagnet from a battery 402, as will be obvious from the circuit shown.

The foot valve device 26, forming another link in the safety control apparatus, comprises a casing in which is provided a valve chamber 404 having disposed therein a valve 405 urged toward a seated position by a spring 406. The valve 405 is adapted to control the flow of fluid from the valve chamber 404, which is connected to the feed valve device by pipes 234, 235 and 236, and an intermediate chamber 408. Communication between this intermediate chamber 408 and a third chamber 409 is controlled by a diaphragm 410 coacting with a seat 411. The diaphragm 410 is held upon the seat 411, and the valve 405 urged away from its seat, by the downward movement of a foot pedal 412, which acts upon a member 413 engaging the diaphragm 410. A spring 414 urges the foot pedal 412 upwardly.

The cut-off valve device 28, also forming part of the safety control apparatus, is embodied in a casing provided with a diaphragm 416, which is adapted to cause a valve 417 to be seated when the pressure above the diaphragm exceeds a predetermined value, to cut off communication between a chamber 418, in communication with the intermediate chamber 408 in the foot valve device by way of pipe 419, and a chamber 420 having communication with the magnet valve device 38 by way of pipe 421.

The pressure above the diaphragm is controlled by a valve 424, which is urged toward a lower seat 425 by a spring 426, and toward an upper seat 427 by pressure acting upon the lower end of the valve. When the valve 424 is in lower seated position, the chamber above the diaphragm 416 is in communication with the atmosphere through a passage 429. Pressure to operate the diaphragm 416 is supplied from a chamber 423, which connects by pipe 430 with the aforementioned control pipe 218 leading to the brake valve device 20. When the pressure in this chamber 423 reaches a predetermined value, the valve 424 is actuated from its lower seat 425 to its upper seat 427, to cut off communication with the atmosphere and to permit fluid to flow to the chamber above the diaphragm 416. Fluid pressure from the control pipe 218 therefore acts upon the diaphragm 416 to cause seating of the valve 417.

When the pressure above the diaphragm drops below a predetermined value, the valve 417 is unseated by the pressure in chamber 418, which may then flow to the chamber 420 and from thence to the magnet valve device 38.

The magnet valve device 38 is embodied in a casing having a valve chamber 434 in which is disposed a double beat valve 435 urged toward an upper seated position by spring 436. The valve chamber 434 is in communication with the piston chamber 387 in the application valve portion 342 of the emergency valve device 22, by way of pipe and passage 438. When the double beat valve is in upper seated position, the piston chamber 387 is in communication with the chamber 423 in the cut-off valve device 28, and when the double beat valve is in lower seated position, the piston chamber 387 is vented to the atmosphere by way of port 440. The double beat valve 435 is urged toward lower seated position by action of an electromagnet in the upper part of the valve device casing, which when energized actuates the double beat valve downwardly.

Energization of the electromagnet in the valve device 38 is controlled by pneumatic switch devices 34 and 36. These two switch devices are similar, each containing a piston 442 urged to a biased position by a spring 444.

The piston 442 in the switch device 34 is provided with a stem having secured to and insulated therefrom a movable contact 446, which is adapted to engage and bridge stationary contacts 447 when the piston is urged to its biased or left hand position by the spring 444. When the piston 442 in this switch device is urged to the right, as by the supply of fluid under pressure to the left thereof, movable contact 446 disengages from stationary contacts 447.

The switch device 36 similarly has stationary contacts 448 which are adapted to be bridged by a movable contact 449, also secured to and insulated from a stem integral with the piston 442 in this switch device. When the piston 442 in this switch device is actuated upwardly, this movable contact 449 disengages from the stationary contacts 448.

When the contacts 447 and 446 in the switch device 34, and the contacts 448 and 449 in the switch device 36, are in engagement, respectively, the electromagnet in the magnet valve 38 is energized from a battery 450, by way of conductors 451 and 452.

The switch device 34 has its piston chamber connected to the aforementioned timing reservoir 32, while the piston chamber of the switch device 36 is connected by a pipe 453 to the brake cylinder 14. The purpose of this arrangement will appear presently.

The retardation controller device 24, which limits the rate of retardation produced by an application of the brakes, is provided with a cylindrical slide valve 456 slidable in a portion of the casing embodying the retardation controller device and operable to control the flow of fluid in the control pipe 218 to the master control mechanism 18. The slide valve 456 is provided with a fluted portion 457 which is adapted, in one position of the valve, to permit flow to the master control mechanism 18, by way of a volume reservoir 460, to cut off flow in another position, and to release fluid under pressure from the master control mechanism in still another position, through ports and passages as will hereinafter be more fully described.

The slide valve 456 is urged toward a biased position to the left by a spring 461. Additional tension may be placed on the spring 461 by movement of a piston 462 to the right under action of a spring 463, which is normally compressed by fluid pressure acting upon the piston 462 from the brake pipe 122, the connection thereto being through a pipe 464. When the pressure acting on the right of the piston 462 is diminished, the spring 463 actuates piston 462 and the upper end of a lever 465 to the right. The lever 465 is pivoted intermediate its ends, at 469, to a lug projecting from the casing of the retardation controller device, and upon movement of its upper end to the right its lower end actuates a movable abutment 467 to the left to place additional tension on the spring 461.

Movement of the slide valve 456 to the right is governed by movement of an inertia operated body 470, which is provided with wings or flanges 472 bearing upon frictionless rollers 473. The body 470 is normally held in a biased position to the right by action of the spring 461 acting through the slide valve 456 upon an operating lever 474 pivotally mounted at 475. When the inertia operated body 470 is caused to move to the left, the body rotates the lever 474 in a counterclockwise direction about its pivot 475 to actuate the slide valve 456 to the right. If the pressure in the brake pipe 122 is maintained at its normal value, the opposition offered by the spring 461 to the movement of the body 470 to the left is relatively less than when the brake pipe pressure has been reduced, as will be obvious from the arrangement described.

Now the retardation controller device 24 is positioned on the train or vehicle so that the body 470 is acted upon by a force of inertia, tending to move it to the left, corresponding to the rate of deceleration of the vehicle or train. Therefore the slide valve 456 is caused to be actuated to the right in accordance with the rate of deceleration of the vehicle or train. It will then be obvious that the valve 456 will be actuated a given distance at one rate of retardation when the brake pipe pressure is maintained at a normal value, and to the same distance at a different rate of retardation when the brake pipe pressure has been reduced.

The conductor's valve device 40 is provided with a valve chamber 478 in which is disposed a valve 497 held upon a seat 480 by a spring 481. The valve chamber 478 is connected to the brake pipe 122 by pipe 464, and when unseated the valve 479 releases fluid under pressure from the brake pipe to the atmosphere, by way of port 482. Unseating of the valve 479 is caused by operation of a lever 483, which is pivotally mounted at 484. Operation of the lever 483 in a counterclockwise direction actuates an intermediate lever 485 downwardly, which by engagement with the valve stem 486 causes unseating of the valve.

Also connected to the brake pipe is a pneumatic switch device 488, which may be included in the brake equipment for the purpose of rendering the motive power of the train or vehicle ineffective in case of accidental loss or intended reduction of pressure in the brake pipe. This switch device, which is similar to the aforedescribed switch device 36, comprises a casing defining a piston chamber having a piston 489 therein, urged downwardly by a spring 490. The piston 489 is provided with a stem having secured thereto and insulated therefrom a movable contact 491, which in the downward position of the piston 489 engages and bridges stationary contacts 492.

The piston 489 is adapted to be urged to its uppermost position so long as the pressure in the brake pipe is maintained above a predetermined value, whereupon the movable contact 491 is maintained out of engagement with the stationary contacts 492. When the pressure in the brake pipe drops below this predetermined value, the piston 489 moves downwardly and movable contact 491 engages stationary contacts 492 to close a circuit to a suitable operating means, such as a circuit breaker, to render the motive power of the train or vehicle ineffective.

*Operation*

The operation of this embodiment of my invention is as follows:

When the train or vehicle is running, the handle 318 of the brake controlling valve device 20 is maintained in release position, which is that designated in Figure 3 as "Release". In "Release" position of the handle 318, the pressure chamber 282 is vented to the atmosphere, because the cam 315 now permits the movable pivot carrier 307 to move to its extreme left hand position, where the supply valve 283 is seated and the release valve 291 is unseated.

Also, in "Release" position, the brake valve 20 maintains the feed valve device 238 connected to the brake pipe 122, so that the supply reservoir 12 and auxiliary reservoir 110 are charged, through pipes and passages heretofore indicated. The connection from the feed valve device 238 to the brake pipe 122 is by way of pipe 236, brake valve passage 494, rotary valve chamber 322, port 495 in rotary valve 324, passage 496, charging pipe 397, passage 498, cavity 499 in slide valve 384, passage 500, brake pipe chamber 367, and branch pipe 368.

The rotary valve 324 also connects the feed valve device 238 to the timing reservoir 32 by way of port 502 in the rotary valve, and pipe and passage 503. The timing reservoir will then be at feed valve pressure, so that piston 442 in switch device 34 will be urged to the right to cause movable contact 446 to be held out of engagement with stationary contacts 447.

Since in "Release" position of the handle 318 the pressure chamber 282 is vented to the atmosphere and the brake pipe 122 is fully charged, the other parts will be maintained in release position, which is that shown in the figures depicting this embodiment. The brake cylinder 14 will then be connected to the atmosphere, and the brakes will be held released.

*Service applications by straight air operation*

When it is desired to effect a service application of the brakes, by straight air operation, the brake valve handle 318 is moved through the zone indicated in Figure 3 as "Straight Air Zone" to a degree or extent in accordance with the desired degree of braking. During this movement the rising part of the cam 315 actuates the movable pivot carrier 307 to the right to first seat the release valve 291 and to then unseat the supply valve 283, as heretofore described. Fluid under pressure then flows from the feed valve device 238 to the pressure chamber 282, and from thence to the master control mechanism 18, by way of a first portion of control pipe 218, passage 504, cavity 505, passage 506, another portion of control pipe 218, passages 508 in the retardation controller device 24 (which are now connected by the slide valve 456), volume reservoir 460, and through another portion of control pipe 218. In the master control mechanism 18, the flow is to the upper chamber 212, in the pneumatic portion 190, by way of passage 219, and also to the piston chamber 262, in the master relay valve portion, by way of passage 266 and choke 268.

As the pressure builds up in the upper chamber 212, diaphragm 204 is actuated downwardly to first open release contacts 192 and to then close supply contacts 194. The release valve 174, in the magnet valve mechanism 16, is then first caused to be seated and the supply valve 172 is next caused to be unseated. Fluid under pressure then flows from the supply reservoir 12 to the straight air pipe 164, through passages in the magnet valve mechanism 16 heretofore described. From the straight air pipe 164, the flow is to the under side of relay piston 84, in the control valve device 10, by way of double check valve chamber 149, and also to the lower chamber 214 in the master relay valve mechanism 18.

Fluid pressure below the relay piston 84 actuates the piston upwardly to first effect seating of the release pilot valve 76 and main release valve 70, and then unseating of the supply pilot valve 65 and main supply valve 54. When this takes place, fluid under pressure is supplied from the supply reservoir 12 to the brake cylinder 14, to apply the brakes.

As the pressure in the lower chamber 214, of the master relay valve mechanism 18, builds up to within a predetermined values of that in the upper chamber 212, diaphragm 204 moves upwardly a sufficient distance to open supply contacts 194. Supply valve 172 is then caused to be seated, whereupon the supply of fluid under pressure to the straight air pipe 164 is lapped. When this supply is lapped, the relay piston 84 moves downwardly to lap position, thus lapping the supply to the brake cylinder 14. The brake valve handle 318 is of course left in the position to which it has been moved, and since the pressure in upper chamber 212 corresponds to the degree of movement of this handle, it follows that the degree of application of the brakes, whether on a single vehicle or on a train comprising a number of vehicles, also corresponds to the degree or extent of movement of this handle.

When fluid is supplied to piston chamber 262, to the left of piston 258, in the master relay valve mechanism, the piston is actuated to the right where stem 260 engages pilot valve stem 245, where the movement of the piston is arrested. In this position the slide valve 250 blanks exhaust ports 252 and 254.

When fluid is supplied to the straight air pipe 164, it also flows to the relay slide valve chamber 246, by way of passages 237 and 507. From slide valve chamber 246, fluid flows through the groove 222 to the right side of piston 258. If the pressure to the right of piston 258 should exceed the pressure to the left, then the piston moves to the left to cause slide valve 250 to uncover exhaust ports 252 and 254. When this takes place the pressure to the right of piston 258 will be reduced, and it will thus be obvious that the piston is maintained in its lap position during this phase of the operation of the equipment.

If however the magnet valve mechanism 16 should fail to supply fluid under pressure to the straight air pipe 164, then the pressure supplied to the left of relay piston 258 would cause the piston to move further to the right, whereupon it would effect unseating of the supply valve 228, to effect a supply of fluid under pressure from the feed valve device 238 to the straight air pipe 164, and hence to the volumes connected thereto. By this arrangement then if there should be a loss of power from the battery 199, or broken conductors between the pneumatic switch portion 190 and the magnet valve mechanism 16, or other faults in this connection, a service application of the brakes would be effected by operation of the master relay valve portion 226. For a given position of the brake valve handle 318, the degree of fluid under pressure supplied to the straight air pipe 164 is the same, whether by operation of the magnet valve mechanism 16 or by operation of the master relay valve portion 226.

When fluid under pressure flows from the control pipe 218 to the piston chamber 262, in the master relay portion 226, it also flows through passage 266 to the chamber below the check valve 270. When the pressure in this chamber has reached a predetermined value, the check valve 270 is unseated, against opposition of its spring 273, and fluid flows through passage 237 to the lower chamber 214 in the penumatic switch portion 190, which takes place at the same time as the flow from the control pipe through passage 219 to the upper chamber 212.

In order that the pneumatic switch portion 190 shall be made promptly responsive to differential pressures acting upon diaphragm 204, the parts must be made relatively light. Therefore the differential pressures which may be applied to the diaphragm 204 should be limited to some predetermined low value which will not place undue strains on the parts. The tension exerted by spring 273 on check valve 270 is therefore so proportioned that when an application of the brakes is effected, the maximum pressure differential which may act upon the diaphragm 204 from above is limited to a predetermined low value, which is sufficient to actuate the diaphragm downwardly to close supply contacts 194 but is low enought not to damage the parts. Similarly in releasing the brakes following an application, the spring 273 acting upon check valve 272 limits the differential which may act upon the diaphragm from below, because as soon as the pressure in the lower chamber 214 exceeds that in the upper chamber 212 by a predetermined amount, the differential pressure will unseat check valve 272 and there will be flow through passages 215, 237 and 266 to the upper chamber 212.

It will thus be seen that the two check valves 270 and 272 function to limit the differential of pressure which may be established across the diaphragm 204. Actually then, when fluid under pressure flows from the straight air pipe 164 to the lower chamber 214 it merely reduces the differential acting upon the diaphragm 204 from above.

Further, when the pressure in the supply reservoir 12 has equalized with that in the brake cylinder 14, as may take place during a full service application, the pressure of fluid supplied to the under side of relay piston 84 from the feed valve device 238, due to a connection being established between the control pipe 218 and the straight air pipe 164 by unseating of check valve 270, may be so greatly in excess of that in the supply reservoir at this time that the relay piston cannot lap the supply to the brake cylinder. To prevent this and to insure that the relay piston can move to lap position for such a condition, the check valve 286, and its spring 287, have been provided in the brake valve device 20.

When the brakes are thus applied and the train or vehicle begins to decelerate, the body 470 in the retardation controller device 24 moves to the left. As may be seen from the diagrammatic representation in Figure 2, the charging pipe 497 is maintained in communication with the feed valve device pipe 236 throughout the entire "Straight Air Zone", so that brake pipe 122 remains fully charged and the piston 462 in the retardation controller device is therefore held to the left. Opposition to movement of the body 470 is then opposed only by the normal tension on spring 461.

If then the brakes are applied to a degree such that the rate of retardation is great enough to cause the body 470 to move to the position where the slide valve 456 disconnects the two passages 508, then the flow of fluid under pressure to the master relay valve mechanism 18 will be cut off, and it will be obvious that the control of the supply to the master relay valve mechanism will then be taken away from the brake valve device 20, so that further movement of the brake valve handle 318 in the "Straight Air Zone" will have no effect upon the degree of application of the brakes.

If the rate of retardation is high enough to cause the body 470 to move to its extreme left hand position, to where it engages the adjustable stop 510, then the slide valve 456 will connect the right hand passage 508 with an exhaust passage 511. Fluid pressure in the upper chamber 212, of the pneumatic switch portion 190, will then be released to the atmosphere, so that diaphragm 204 will move upwardly to cause closing of release contacts 192. When this takes place release valve 174, of the magnet valve mechanism 16, will be unseated and fluid under pressure in the straight air pipe 164 will be released to the atmosphere. In response to this release of pressure, the relay piston 84 will move further downwardly to effect a corresponding release of pressure from the brake cylinder 14.

The volume of the upper chamber 212 and the control pipe 218 is relatively small, so that if additional volume is not provided the retardation controller device would release the entire pressure in these volumes to the atmosphere before the rate of retardation of the train could be changed sufficiently to cause the body 470 to move back to the right and cut off such release. Such a condition would be undesirable, as the rate of retardation of the train would be constantly changing and a constant maximum rate could not be maintained. In order to provide the necessary volume in the control pipe 218 and the upper chamber 212, the volume reservoir 460 has been provided. The retardation controller device can then only release a relatively small amount of pressure from upper chamber 212 before the rate of retardation changes, and a more nearly constant rate of retardation can thus be maintained.

It will thus be obvious that the body 470 in the retardation controller device may move back and forth to so control the pressure in the upper chamber 212 as to limit the rate of retardation produced due to application of the brakes to a maximum constant value. In practice however, the body 470 will first lap or cut off the supply to the upper chamber 212, then as the train or vehicle decelerates it will move to intermittently effect a release of pressure from this chamber. This only is usually necessary, because as the vehicle decelerates the coefficient of friction between the rubbing parts of the brakes will increase and unless the pressure in the brake cylinders is diminished, the rate of retardation will increase. Therefore after the retardation controller device has taken control, its principal function is to diminish the pressure in the upper chamber 212 in accordance with the increase of the coefficient of friction between the rubbing parts of the brakes.

Of course as the pressure in the upper chamber 212 is varied, release contacts 192 (and supply contacts 194 if necessary) are accordingly operated to cause operation of the release valve 174 (and supply valve 172 if necessary). The pressure in the straight air pipe 164 is thus maintained in accordance with the pressure in the upper chamber 212.

From Figure 2 it will be noted that as the brake valve handle 318 is moved through the first portion of the "Straight Air Zone" the timing reservoir 32 is maintained connected to the feed valve device 238. However when the brake valve handle 318 is moved past a certain point in the "Straight Air Zone", the timing reservoir 32 is connected to an exhaust port 513 through a restricted port 512. When this takes place the pressure in the timing reservoir is released to the atmosphere, by way of exhaust port 513.

Since the release of this pressure is by way of a restricted port, a definite interval of time elapses before the pressure in the timing reservoir has dropped to the point where the switch device 34 causes its movable contact 446 to engage stationary contacts 447. If by the time these contacts engage, the pressure in the brake cylinder 14 has not reached a value where the movable contact 449 is disengaged from the stationary contacts 448 in the switch device 36, then the magnet valve device 38 will be energized from the battery 450. Energization of this magnet valve device will then effect an emergency application of the brakes, as will more fully hereinafter appear.

It will thus be seen that if when the brake valve handle 318 is moved through the latter part of the "Straight Air Zone" the apparatus should fail to respond to produce a definite brake cylinder pressure, then the apparatus functions to effect an emergency application of the brakes.

When it is desired to effect a release of the brakes, following a straight air service application, the brake valve handle 318 is moved to "Release" position. In this position, the supply valve 283 is seated by spring 285, and release valve 291 is unseated by spring 293. Fluid under pressure is then released from the pressure chamber 282, and control pipe 218, to the atmosphere. This release of pressure from the control pipe 218 also vents the upper chamber 212, whereupon diaphragm 204 moves upwardly to close release contacts 192.

Closing of these contacts energizes release electromagnet 178, which unseats release valve 174. Since when release contacts 192 are closed, the supply contacts 194 are opened, supply valve 172 will have previously been seated. Unseating of release valve 174 will then release pressure in the straight air pipe 164 to the atmosphere, via port 185. Relay piston 84 will then move downwardly to effect seating of its supply valve 54 and unseating of its release valve 70. Pressure chamber 48, and brake cylinder 14, will then be vented to the atmosphere.

If when the brake valve handle 318 is thus moved to "Release" position, the slide valve 456 in the retardation controller device 24, should be in a position where the two passages 508 are not connected together, then spring seated check valve 519 will be unseated to connect these two passages as soon as the pressure in the left hand passage 508 will have fallen to a predetermined value below that in the right hand passage 508. It will thus be seen that regardless of the position of the slide valve 456 in the retardation controller device, the operator may effect a release of the brakes by movement of the brake valve handle 318.

*Service applications by automatic operation*

If for any reason the straight air portion of the brake equipment should be rendered inoperative, then service applications may be effected by automatic operation. To effect a service application of the brakes by automatic operation, the brake valve handle 318 is moved to the position indicated in Figure 3 as "Automatic Service". In this position the charging pipe 497 (and hence brake pipe 122) is disconnected from the feed valve pipe 236, and the brake pipe 122 is connected to exhaust port 513, through a port in the rotary valve 324 having a restriction 515, so that fluid under pressure is vented to the atmosphere at a service rate.

This reduction in brake pipe pressure also reduces the pressure in piston chamber 117, of the triple valve portion 44 of each control valve device 10, as well as in piston chamber 341 of the emergency valve device 22. In the control valve device 10, the triple piston 116 moves upwardly to service position, whereupon auxiliary reservoir 110 is connected to the relay piston chamber 85, below piston 84, and to volume reservoir 144. Fluid under pressure then flows from the auxiliary reservoir 110 to these two volumes, at a service rate. The relay valve portion 42, of the control valve device 10, then functions to supply fluid under pressure from the supply reservoir 12 to the brake cylinder 14, in accordance with the pressure established below the piston 84.

As before explained, during automatic operation of the equipment, the double check valve piston 148 moves to the left, to connect passage 147 leading to the chamber below relay piston 84 with the slide valve chamber 146.

In the emergency valve device 22, as the pressure in piston chamber 347, to the left of emergency piston 346, reduces at a service rate, the piston moves gradually to the left until the tail stop 354 engages the main slide valve 344, where movement of the piston is arrested. In this position, the piston 346 blanks the port 366, and port 516 in the graduating valve 345 is in registration with main slide valve port 517. Main slide valve port 517 is at this time in registration with exhaust port 518, so that fluid under pressure in the slide valve chamber 343, and quick action chamber 364, is released to the atmosphere. The size of the port 516 is such that the pressure to the right of piston 346 reduces at practically the same rate as the pressure to the left of the piston when reduced at a service rate.

The slide valve chamber 343 will continue to be vented in this manner until the pressure to the left of emergency piston 346 slightly overbalances that to the right of the piston, whereupon the piston will be moved back to its release position. The emergency valve device 22 is thus caused to remain inoperative during service reductions in brake pipe pressure, and as will be more fully explained later, can operate only in response to emergency reductions in brake pipe pressure.

It is intended that service applications of the brakes by automatic operation shall be effected only when the straight air portion of the equipment is inoperative. Of course if the straight air portion were operative, movement of the brake valve handle 318 to "Automatic Service" position would result in both straight air and automatic operation. It is preferable that the pressure of the fluid supplied by the supply reservoir 12 be greater than that supplied by the auxiliary reservoir 110, so that in such cases, the double check valve piston 148 would remain to the right, as shown, and the relay valve portion 42 would be actuated in accordance with straight air operation. Further discussion of simultaneous straight air and automatic operations will be taken up under a description of emergency applications of the brakes.

In making applications of the brakes by automatic operation, the operator holds the brake valve handle 318 in "Automatic Service" position a length of time sufficient to effect the desired degree of brake application, and thereafter moves the brake valve handle to "Lap" position.

When the automatic portion of the equipment alone is effective, the retardation controller device 24 does not function to limit the rate of retardation, but the entire control of the degree of application is retained by the operator at the brake valve device.

When it is desired to effect a release of the brakes, following an automatic service application, the brake valve handle 318 is moved to "Release" position. In this position, as will be noted from Figure 2, the brake pipe 122 is disconnected from the exhaust port 513, and charging pipe 497 is reconnected to the feed valve pipe 236. The brake pipe is thus recharged from the feed valve device 238, via the pipe and passages heretofore described.

As the pressure in the brake pipe builds up, the triple piston 116, in the control valve device 10, moves downwardly to its release position, to connect the volume reservoir 144 and the volume below relay piston 84 to the atmosphere. Relay piston 84 then moves downwardly to its release position, whereupon pressure in brake cylinder 14 is released to the atmosphere, and the brakes are accordingly also released.

*Emergency applications*

When it is desired to effect an emergency application of the brakes, the brake valve handle 318 is moved to "Emergency" position. In this position of the brake valve handle, the cam 315 actuates the pivot carrier 307 the full distance to the right, and at the same time the rotary valve 324 disconnects the charging pipe 497 (and hence the brake pipe 122) from the feed valve device 238, and reconnects the brake pipe 122 to exhaust port 513, through an enlarged port 520 in the rotary valve.

Movement of the pivot carrier 307 to the right actuates the self-lapping valve portion 276 to permit fluid pressure in pressure chamber 282 to build up to the maximum possible degree. Connection of the brake pipe to the atmosphere through enlarged port 520 releases pressure in the brake pipe to the atmosphere at an emergency rate.

When the pressure in the brake pipe is reduced at an emergency rate, emergency piston 346, in the emergency valve device 22, immediately moves to the left to a position where the tail stop spring 355 has been compressed to the point where the lower edge 431 of the tail portion has engaged the main slide valve 344. When this takes place the graduating valve 345 has uncovered main slide valve port 466, so that fluid under pressure flows from the slide valve chamber 343, and quick action chamber 364, through port 466 and passage 468, which registers with port 466, to the space above vent valve piston 379.

This flow takes place at a rapid rate so that sufficient pressure builds up in the space above vent valve piston 379 to actuate the piston downwardly to unseat vent valve 372. Unseating of this valve then further vents fluid under pressure from brake pipe chamber 367, and brake pipe 122, to the atmosphere by way of exhaust port 378, so that there is a sharp drop in pressure immediately adjacent the emergency piston 346, and to a degree such that the overbalancing pressure to the right of the piston actuates it to its extreme position to the left. The slide valve 344, which up to this time has remained at rest, is thus moved to application position.

In application position, the slide valve 344 uncovers port 468, so that continued flow of fluid from slide valve chamber 343, and quick action chamber 364, to the space above piston 379 takes place, disconnects passage 504 from passage 506 and connects passage 506 with a passage 521, which, through a ball check valve 522 held seated by a spring 523, is in communication with the aforementioned pipe and passage 362 leading to the feed valve device 238.

When the main slide valve 344 blanks the passage 504, pressure chamber 282 in the brake valve device 20 is isolated, and the control pipe 218 is connected directly, through passage 521, with the feed valve device 238. Fluid then flows from the feed valve device 238 through pipes 236 and 235, pipe and passage 362, past the spring loaded ball check valve 522, passage 521, cavity 505, and passage 506 to control pipe 218, from whence it flows to the master relay mechanism 18, to effect an application of the brakes, to a maximum degree, in the manner already described for service applications by straight air operation.

At the same time, the emergency reduction in brake pipe pressure causes triple piston 116 to move upwardly to emergency position, and thereby connect the auxiliary reservoir 110 to the volume reservoir 144 and slide valve chamber 146, past the end of slide valve 112 and through port 142, which contains a restriction therein which acts to cause the pressure to build up in chamber 146 slower than in chamber 149. It will thus be seen that fluid under pressure is supplied to the slide valve chamber 146 at a relatively slow rate by automatic operation and to the double check valve chamber 149 at a relatively high rate by straight air operation. Obviously then the pressure which predominates will actuate the double check valve piston to the right or to the left, depending upon whether the pressure in chamber 146 or chamber 149 is the greater.

It is intended that the supply reservoir 12 shall effect a greater ultimate pressure than the auxiliary reservoir 110. Therefore regardless of the initial state of the pressures in the two chambers 146 and 149, eventually the pressure supplied by the supply reservoir will predominate, and the ultimate application of the brakes will be by straight air operation, so that the application will be subject to control by the retardation controller device 24.

When the double check valve piston 148 is held to the right, as shown in Figure 1C, the chamber 146 is connected to the safety valve device 170. The safety valve device 170 is preferably set so that there is retained in the chamber 146, and the auxiliary reservoir 110 and volume reservoir 144, a pressure high enough to effect an application of the brakes to a degree sufficient to bring the train or vehicle to a stop, in case the pressure supplied by straight air operation should at any time be lost.

During emergency applications the ball check valve 522 and its spring 523 serve the same purpose as ball check valve 286 and its spring 287 during service applications, that is, it prevents an excessive differential of pressure from acting on the relay piston 84.

When fluid under pressure is supplied to the master relay mechanism 18 (through the control pipe 218) during emergency applications, the pressure to the left of master relay piston 258 builds up faster than that to the right, with the result that the piston is moved to the right, to effect unseating of the supply valve 228. When this takes place, pipe 234, leading to feed valve device 238, is connected to straight air pipe 164. Fluid under pressure is then supplied to the straight air pipe 164 from both the supply reservoir 12 and the feed valve device 238. This results in a faster application of the brakes, as well as increasing the reliability of operation.

When the brake pipe pressure is reduced, piston 462 in the retardation controller device 24 moves to the right under pressure of spring 463, so that the tension on opposing spring 461 is increased. The retardation controller device is therefore conditioned to permit a higher rate of retardation due to application of the brakes.

Therefore, as the train or vehicle decelerates, a greater force of inertia (and hence rate of retardation) will be required to actuate the body 470 to the position where the supply of fluid through the control pipe 218 is lapped. Correspondingly, a higher rate of retardation is required to effect a release of the brakes. The retardation controller device therefore permits a higher rate of retardation during emergency applications than during service applications.

In order that the emergency vent valve 372 shall be closed shortly after the brake pipe has been reduced to atmospheric pressure, a leak port 524 has been provided in the vent valve piston 379, so that after a predetermined length of time the pressure above the piston, and in chambers 343 and 364, will have been released to the atmosphere, and spring 374 will then seat the vent valve 372.

When the double check valve piston 148 is held to the right against gasket 165, the chamber 146, and auxiliary reservoir 110, are connected to the safety valve device 170. As before explained, the pressure retained in these volumes is sufficient to bring the train to a stop, should the straight air portion of the equipment fail after an emergency application, or an automatic service application, has been effected. In addition, the pressure retained in these volumes, which are connected to the slide valve chamber 114, is preferably low enough so that when the brake pipe pressure is restored in releasing the brakes, the triple piston 116 will be positively and promptly moved to release position.

When it is desired to effect a release of the brakes following an emergency application, the brake valve handle 318 is moved to "Release" position. In this position, the brake pipe is reconnected to the feed valve device, as before explained for a release following an automatic service application, and the pressure chamber 282 in the brake valve device is vented to the atmosphere. Restoration of pressure in the brake pipe causes the emergency piston 346 in the emergency valve device 22 to return to release position, and the control pipe 218 is again connected to the pressure chamber 282, and hence to the atmosphere.

At the same time, pneumatic switch portion 190, of the master relay mechanism 18, effects energization of release electromagnet 178, to release pressure in the straight air pipe 164 to the atmosphere. The other parts then come to release position, the brake cylinder is vented to the atmosphere and the train or vehicle brakes are then released.

*Special emergency applications*

As before explained, if a predetermined brake cylinder pressure has not been produced within a predetermined time in response to a chosen movement of the brake valve handle 318 to certain positions in the "Straight Air Zone", the magnet valve device 38 will be energized. When this device is energized, piston chamber 387 of the application valve device 342 is connected to the atmosphere through port 440 in the magnet valve device. This release of pressure from the piston chamber 387 causes the piston 385 therein to move to the left, carrying slide valve 384 therewith. Cavity 499 in the slide valve 384 then connects passage 500, leading to brake pipe chamber 367, with an exhaust port 525. Brake pipe chamber 367, and brake pipe 122, are then connected to the atmosphere and brake pipe pressure is reduced at the same rate as when the brake valve handle 318 is moved to "Emergency" position. An emergency application of the brakes then follows in the manner just described above.

An emergency application of the brakes may be also effected by rotation of the lever 483, of the conductor's valve device 40, in a counter-clockwise direction. When this is done valve 479 is unseated to vent the brake pipe to the atmosphere at an emergency rate. Since the conductor's valve device may be provided on each car in the train, it follows that an emergency application of the brakes may be effected from a number of points throughout the train.

When an emergency application is effected by energization of the magnet valve device 38, slide valve 384 in the application valve device 342 blanks the port 498, so that the charging pipe 497 is isolated. This prevents loss of fluid supplied by the feed valve device 238. On the other hand, when an emergency application is effected by operation of the conductor's valve device 40, the brake pipe is vented while still connected to the feed valve device through the charging pipe 497. To prevent an undue loss of fluid, the operator may move the brake valve handle to "Lap" position as soon as he notices that the train is being decelerated due to an application of the brakes.

Operation of safety features

When the train is running, the operator maintains pressure on either the foot pedal 412 of the foot valve device 26, or on the push button 328 on the brake valve handle 318. If through accident or design the operator should release pressure from both of these simultaneously, then the pressure in the piston chamber 387, of the application valve device 342, will be released to the atmosphere, through the magnet valve device 38, past the unseated valve 417 in the cut-off valve device 28, past the unseated diaphragm 410 in the foot valve device 26, and past the unseated release valve 397 and through port 400 in the magnet valve device 30, which becomes de-energized upon release of pressure on the push button 328. The application valve piston 385 then moves to the left to connect passage 500 to the exhaust port 525, to effect an emergency application of the brakes, as already explained.

When the brake valve handle 318 is moved through the "Straight Air Zone" to effect a service application of the brakes, chamber 423 in the cut-off valve device 28 is connected by pipe 430 to the control pipe 218. Fluid under pressure therefore flows to this chamber 423, and when the pressure therein has reached a predetermined value, the valve 424 is unseated from seat 425 and seated upon seat 427, so that fluid flows to the chamber above diaphragm 416. When the pressure in this chamber has reached a predetermined value, the valve 417 is seated, so that the operator may now release pressure from both the foot pedal 412 and the push button 328 without effecting an emergency application of the brakes.

If at any time there should be a broken pipe or undue leakage in the straight air pipe 164, when fluid under pressure is supplied thereto, or should both supply valve 172 and release valve 174, in the magnet valve mechanism 16, be unseated simultaneously, the pressure in supply reservoir 12 may be reduced to a value where spring 188, in the magnet valve mechanism 16, actuates diaphragm 187 downwardly to seat cut-off valve 182. Further loss of fluid is thereby prevented and sufficient pressure is retained in the supply reservoir to bring the train or vehicle to a stop by automatic operation of the equipment. The pressure thus retained in the supply reservoir is preferably slightly below that obtaining when the supply reservoir equalizes with the brake cylinder.

Modification of Figure 4

The apparatus shown in Figure 1A may be modified to the extent shown in Figure 4, and the whole equipment still accomplish the same results as before. In Figure 4 the timing reservoir 32, and the apparatus associated therewith, and certain of the apparatus associated with the safety control mechanism, have been omitted for the sake of clarity, but it is to be understood that these devices, and their functioning, form an important part of my invention.

In Figure 4 the brake valve device 20 is shown only in fragmentary form, but it is to be understood that this valve device may be the same as that shown in Figure 1A. Ports 502 and 503 shown in Figure 1A, and normally controlling the pressure of fluid in the timing reservoir 32, have been omitted for the reason aforestated.

In the emergency valve device 22, the parts are essentially the same as before, except that the ports in the main slide valve 344, and in its seat, have been somewhat changed. Cavity 505 in Figure 1A has been replaced by cavity 526 in Figure 4, ball check valve 522 has been omitted and passage 362 now leads to the seat of the main slide valve 344, while the two passages 504 and 506 of Figure 1A have been replaced by a passage 527, which is connected by cavity 526 in release position of the slide valve 344 to a passage 528 leading to exhaust port 529. Passage 362 is, as before, connected to pipe 362 leading to the feed valve device 238, and is also in communication with the chamber above the loading diaphragm 357.

The application valve portion 342 of the emergency valve device of Figure 1A has been replaced by the application valve portion 530 of Figure 4. This portion is provided with a valve chamber 531 in which is disposed a supply valve 532 urged toward a seated position by a spring 533. Integral with the valve 532 is a stem 534 which has secured to its other end a release valve 535, which is in unseated position when the valve 532 is in seated position. The release valve 535 is disposed in a chamber which is in constant communication with the atmosphere by way of passage 536.

The valve stem 534 is fluted and is disposed in a bore which by way of pipe and passage 538 is connected to a double check valve device 540, which is in turn connected to the control pipe 218.

The release valve 535 is disposed in a chamber 539, to one side of a diaphragm 541, and the chamber 539 is in communication with the atmosphere via the aforesaid port 536. A second chamber 542, to the other side of diaphragm 541, is in communication with the aforementioned passage 527 in the main portion of the emergency valve device, by way of passage 543. As before described, the passage 527 is connected to the atmosphere via exhaust port 529 when the slide valve 344 is in release position, but when the slide valve 344 moves to application position, cavity 526 connects passage 527 to the passage 362 leading to the feed valve device 238. When this takes place, fluid under pressure is supplied through passages 527 and 543 to the chamber 542 below diaphragm 541, whereupon the diaphragm moves upwardly to seat release valve 535 and unseat supply valve 532.

Chamber 531 is in communication with passage 362, by way of a passage 537, in which is disposed a ball check valve 544 urged to a seated position by a spring 545, so that when valve 532 is unseated fluid under pressure may flow from passage 362 past the unseated valve 532 to pipe and passage 538 leading to the double check valve device 540. The spring loaded check valve 544 is provided for the same purpose as check valves 286 and 522 in Figure 1A.

When valve 532 is seated and valve 535 is unseated, fluid pressure in pipe and passage 538 is released to the atmosphere by way of port 536.

The application valve portion 530 is also provided with a piston chamber 546 in which is disposed a piston 547. The portion of the piston chamber 546 above the piston 547 may be connected via passage 548 and pipe 421 direct to the cut-off valve device 28, although the magnet valve device 38 may be interposed between the passage 548 and the pipe 421, as shown and for the purpose described in connection with Figure 1A. The portion of the piston chamber 546 beneath piston 547 may be connected by way of passage 549 to charging pipe 497. This portion of the chamber may also be in communication with the brake pipe chamber 367, and hence brake pipe 122, by way of passage 550, so that the brake pipe may be normally charged by way of charging pipe 497, passage 549, piston chamber 546, passage 550, brake pipe chamber 367, and branch pipe 368.

The piston 547 is provided with a stem 552 having secured thereto or integral therewith a piston valve 553, normally urged toward a seat 554 by a spring 555. The piston valve 53 is adapted to permit communication between the aforementioned passages 549 and 550 so long as it is held upon its seat 554, but when the piston valve is actuated from its seat, as when the pressure acting below piston 547 overbalances that acting above the piston, passages 549 and 550 are disconnected, and passage 550 is connected to the atmosphere past the unseated piston valve 553, and by way of port 556. Thus upon operation of the safety control mechanism of the equipment to effect an emergency application of the brakes, the portion of chamber 546 above piston 547 is vented to the atmosphere, whereupon piston 547 moves upwardly to isolate the charging pipe 497, and to connect the brake pipe to the atmosphere, by way of passages 550 and port 556.

The retardation controller device 24 shown in Figure 4, has been modified to the extent that the setting of the retardation controller device during emergency applications has been divorced from control by the pressure in the brake pipe. The retardation controller device of Figure 4 is provided with a spring 558 similar to and for the purpose of spring 461 of Figure 1A. Initial tension of this spring is provided by an adjusting screw 559 acting upon a piston 560 having a stem 561 connected to a movable abutment 562 engaging the spring. The spring 558 therefore functions during straight air operation of the brakes in the same manner as spring 461 of Figure 1A.

The piston 560 is disposed in a chamber 563, which through pipe 564 is in communication with the aforementioned passage 527 in the emergency valve device. Therefore when the emergency valve device is actuated to application position, fluid under pressure is supplied from the feed valve device 238 to the piston chamber 563 to the right of piston 560, flow being through a port 565 in the cylinder bushing. The spring 558 is thus compressed until piston 560 moves to its extreme position to the left, and the retardation controller device is therefore set for a higher rate upon operation of the emergency valve device 22, instead of directly upon a reduction in brake pipe pressure.

*Operation of modification shown in Figure 4*

When the train or vehicle is running and the brake valve handle 318 is in "Release" position, the apparatus is recharged as before described in connection with Figures 1A, 1B and 1C.

When a service application of the brakes by straight air operation is effected, the equipment operates as before described, because the modifications shown in Figure 4 do not affect the parts active in such a service application. The same is also true when service applications are effected by automatic operation.

However, when an emergency application of the brakes is effected by movement of the brake valve handle 318 to "Emergency" position, the emergency valve device 22 operates as before described to move the main slide valve 344 to application position. In application position, the main slide valve cavity 526 connects passages 362 and 527. Fluid under pressure then flows from the feed valve device 238 to the under side of diaphragm 541, causing seating of release valve 535 and unseating of supply valve 532. The feed valve device 238 is then connected through passage 537 to pipe and passage 538 leading to the double check valve device 540, and the valve 557 therein is actuated to the left to blank flow from the pressure chamber 282 in the brake valve device, and to permit flow direct from the feed valve device to the control pipe 218, just as was described in connection with operation of the emergency valve device 22 in connection with the embodiment of Figure 1A.

Fluid under pressure also flows from the feed valve device 238 to passage 527 and from thence to pipe 564 and the chamber 563 in the retardation controller device 24, where the piston 560 is actuated to the left to set the retardation controller for the higher emergency rate.

In addition, fluid flows from the passage 527 by way of another pipe 551 to a cylinder 566, where it actuates a piston 567 to the left to operate a handle 568 of a circuit breaker device 569 to "Off" position, thereby rendering the motive power of the vehicle or train ineffective, if this has not already been done.

It will be obvious that the release of the brakes following any kind of application will be as before described in connection with the embodiment of Figure 1A.

When pressure is released from both the push button 328 and the foot pedal 412, in the safety control apparatus, the portion of chamber 546 above piston 547 is vented to the atmosphere, whereupon piston 547 moves upwardly to isolate passage 549 and to connect passage 550 to the atmosphere, as before described. Fluid under pressure will then be released from brake pipe chamber 367, and the brake pipe 122, to the atmosphere at an emergency rate to effect an emergency application of the brakes, as already described.

While I have shown one preferred embodiment of my invention, and one modification thereof, it will be understood that many changes and modifications therein may be made and I do not wish to be limited to the specific apparatus shown, or to the specific arrangement of the apparatus described, or other than by the spirit and scope of the appended claims.

Having now described my invention, what I claim as new and desire to secure by Letters Patent, is:

1. In a train brake system, the combination with a combined automatic and straight air brake equipment, of means including a manually movable control element movable through a service zone for establishing fluid pressures to a degree in accordance with the degree or extent of movement of said control element in said service zone, means responsive to the pressures established by movement of said control element in said service zone for electro-pneumatically effecting an application of the brakes by straight air operation to a degree corresponding to the degree of said fluid pressure, and means responsive to a movement of said element to an emergency position for effecting an application of the brakes by automatic operation to a degree corresponding to the time said element remains in said emergency position.

2. In a combined straight air and automatic brake system, the combination with a brake cylinder, a brake pipe, and a supply reservoir, of valve means for controlling the supply of fluid under pressure from said reservoir to said brake cylinder, means including an electroresponsive valve device for controlling operation of said valve means during straight air operation of the brakes, automatic valve means operated upon a reduction in brake pipe pressure for controlling operation of said valve means during automatic operation of the brakes, a brake controlling valve device having a control handle movable through different zones and operable to establish fluid pressures in accordance with the degree or extent of movement of said handle through a certain zone to effect operation of said second means and operable to reduce the pressure in said brake pipe at either a service rate or an emergency rate when moved through another zone, and a valve mechanism unresponsive to service reductions in brake pipe pressure but responsive to emergency reductions in brake pipe pressure for also venting fluid under pressure from said brake pipe at an emergency rate.

3. In a vehicle brake system, the combination with a brake cylinder, a supply reservoir, a main reservoir, and a brake pipe, of a relay valve device operable to effect a supply of fluid under pressure from said supply reservoir to said brake cylinder, an electroresponsive valve device for controlling operation of said relay valve device, an automatic valve device connected to said brake pipe and operable upon reductions of pressure in said brake pipe for also controlling said relay valve device, a brake valve device having a handle movable through different zones and operable to establish different degrees of pressure of fluid supplied from said main reservoir by movement of said handle through one zone and operable to reduce the pressure in said brake pipe at either a service rate or an emergency rate by movement of said handle through another zone, means responsive to pressures established by said brake valve device for controlling operation of said electroresponsive valve device, and means responsive only to reductions in brake pipe pressure at an emergency rate for also venting fluid under pressure from said brake pipe at an emergency rate.

4. In a vehicle brake system, the combination with a brake cylinder, of a control pipe adapted to be normally at atmospheric pressure, a brake pipe adaped to be normally charged with fluid under pressure, a storage reservoir, a brake valve device operable to supply fluid under pressure from said reservoir to said control pipe to a degree in accordance with the desired degree of braking and operable to effect reductions in brake pipe pressure at either a service rate or an emergency rate, means responsive to the degree of pressure of fluid supplied to said control pipe for supplying fluid under pressure to said brake cylinder, means responsive to the degree of reduction of brake pipe pressure for also supplying fluid under pressure to said brake cylinder, and a valve mechanism responsive only to emergency reductions in brake pipe pressure for disconnecting said control pipe from said brake valve device and reconnecting said control pipe direct to said reservoir.

5. In a train brake system, the combination with a combined automatic and straight air brake equipment, of means including a manually movable control element for electro-pneumatically effecting applications of the brakes by straight air operation to a degree in accordance with the degree or extent of movement of said element, means including a brake pipe and an automatic valve device normally responsive only to movement of said element to an automatic position for venting said brake pipe to effect an application of the brakes by automatic operation, and means whereby upon failure of said equipment to respond to a certain movement of said control element in effecting an application of the brakes by straight air operation said automatic valve device operates to effect an application of the brakes by automatic operation independently of movement of said element to said automatic position.

6. In a vehicle brake system, the combination with a brake cylinder and a supply reservoir, of a relay valve device operable to supply fluid under pressure from said supply reservoir to said brake cylinder, a control pipe adapted to be normally at atmospheric pressure, a brake pipe adapted to be normally charged with fluid under pressure, a brake valve device having a manually movable control element and operable to supply fluid under pressure to said control pipe to a degree corresponding to the degree or extent of movement of said element and operable to effect reductions in brake pipe pressure for a given movement of said control element, means responsive to the pressure in said control pipe for effecting operation of said relay valve device by straight air operation, means including an emergency valve device for effecting operation of said relay valve device by automatic operation, and means whereby for failure of said relay valve device to establish a predetermined pressure in said brake cylinder within a chosen length of time after said control element has been moved to a certain position in effecting straight air operation of the brakes said emergency valve device is caused to be operated to effect an application of the brakes by automatic operation.

7. In a vehicle brake system, the combination with a brake cylinder and a brake pipe, of a brake valve device having a handle movable through different zones, means responsive to the movement of said handle through a certain zone for effecting a supply of fluid under pressure to said brake cylinder by straight air operation, and means responsive to the movement of said handle through another zone for effecting reductions in brake pipe pressure to effect a supply of fluid under pressure to said brake cylinder by automatic operation, an element on said brake valve device adapted to be normally held depressed by the hand of an operator, a foot valve device having an element adapted to be normally held depressed by the foot of an operator, means responsive to the release of pressure from both of said elements simultaneously for effecting a reduction in brake pipe pressure, and means responsive to an application of the brakes by straight air operation for preventing said reduction in brake pipe pressure when pressure on said elements is released simultaneously.

8. In a vehicle brake system, the combination with a brake cylinder and a relay valve device operable to control the supply of fluid under pressure to and its release from said brake cylinder, of means for supplying fluid under pressure by straight air operation to operate said relay valve device, means for supplying fluid under pressure by automatic operation to operate said relay valve device, a valve device subject to the opposing pressures of fluid supplied by straight air operation and by automatic operation and operable to permit the supply of greater pressure only to said relay valve device, a safety valve device, and means actuated by said last mentioned valve device for rendering said supply effected by automatic operation subject to action of said safety valve device when said supply effected by straight air operation actuates said relay valve device.

9. In a vehicle brake system, the combination with a brake cylinder and a supply reservoir, of a relay valve device operable to control the supply of fluid under pressure from said supply reservoir to said brake cylinder and to release pressure from said brake cylinder, a control pipe adapted to be normaly at atmospheric pressure, a brake pipe adaped to be normally charged with fluid under pressure, means responsive to the degree of pressure of fluid supplied to said control pipe for electropneumatically controlling operation of said relay valve device, means operative according to the degree of reduction of pressure in said brake pipe for also controlling operation of said relay valve device, means preventing one of said last two controlling means from controlling said relay valve device when the other of said controlling means is more effective, a brake valve device operable to supply different degrees of fluid under pressure to said control pipe and operable to reduce the pressure in said brake pipe at either a service rate or an emergency rate, a valve mechanism responsive only to an emergency rate of reduction in brake pipe pressure for locally venting fluid under pressure from said brake pipe, and a retardation controller device for controlling the pressure of fluid supplied to said control pipe when the rate of retardation of said vehicle exceeds a chosen value.

10. In a fluid pressure brake, in combination, a brake cylinder, a relay valve device operated by an increase in fluid pressure for supplying fluid under pressure to the brake cylinder, a straight air pipe, means for supplying fluid under pressure through said straight air pipe to said relay valve device, a brake pipe, an automatic valve device operated upon a reduction in brake pipe pressure for supplying fluid under pressure to said relay valve device, and a double check valve device operated by fluid under pressure supplied by operation of said automatic valve device for cutting off communication from the straight air pipe to said relay valve device and for opening communication through which said automatic valve device supplies fluid under pressure to said relay valve device.

11. In a fluid pressure brake, in combination, a brake cylinder, a relay valve device operated by an increase in fluid pressure for supplying fluid under pressure to the brake cylinder, a straight air pipe, means for supplying fluid under pressure through said straight air pipe to said relay valve device, a brake pipe, an automatic valve device operated upon a reduction in brake pipe pressure for supplying fluid under pressure to said relay valve device, and a double check valve device operated by fluid under pressure supplied to said straight air pipe for cutting off the communication through which fluid under pressure is supplied by said automatic valve device to said relay valve device.

12. In a fluid pressure brake, the combination with a brake cylinder, of a relay valve device operated by an increase in fluid pressure for supplying fluid under pressure to the brake cylinder, a straight air pipe, means for supplying fluid under pressure through said straight air pipe to said relay valve device, a brake pipe, an automatic valve device operated upon a reduction in brake pipe pressure for supplying fluid under pressure to said relay valve device, a double check valve device subject to pressure in said straight air pipe and to pressure of fluid supplied by said automatic valve device, and a safety valve device for limiting the build up of fluid pressure on said double check valve device as supplied by said automatic valve device.

13. In a fluid pressure brake, the combination with a straight air pipe, of means operated by fluid under pressure supplied to said pipe for effecting an application of the brakes, a brake pipe, an automatic valve device operated upon a reduction in brake pipe pressure for supplying fluid under pressure to effect an application of the brakes, a double check valve device for controlling a communication through which fluid under pressure is supplied from said straight air pipe and said automatic valve device to effect an application of the brakes, and a valve device for limiting the build up of fluid under pressure on said double check valve device as supplied by said automatic valve device.

14. In a fluid pressure brake, in combination, a straight air pipe through which fluid under pressure is supplied to effect an application of the brakes, a brake pipe, an automatic valve device operated upon a reduction in brake pipe pressure for also supplying fluid under pressure to effect an application of the brakes, a double check valve device for controlling communication through which fluid under pressure is supplied from said straight air pipe and from said automatic valve device to effect an application of the brakes, said straight air pipe being connected to a chamber at one side of the double check valve device and the automatic valve device being connected to a chamber at the other side of the double check valve device, and means for limiting the build-up of fluid pressure in said latter chamber.

15. In a fluid pressure brake, in combination, a straight air pipe, a brake cylinder, a relay valve device operated by fluid under pressure supplied to the straight air pipe for supplying fluid under pressure to the brake cylinder, a brake valve device, means controlled by said brake valve device for supplying fluid under pressure to said straight air pipe, a brake pipe, a double check valve controlling communication from the straight air pipe to the relay valve device, and a triple valve device operated upon a reduction in brake pipe pressure for supplying fluid under pressure to said relay valve device and for effecting the operation of said double check valve to cut off communication from the straight air pipe to the relay valve device.

16. In a fluid pressure brake system, in combination, a brake pipe, a brake application pipe, means operated upon an increase in fluid pressure in said brake application pipe for effecting an application of the brakes, a brake valve device for supplying fluid under pressure to said brake application pipe, valve means operated by an increase in fluid pressure for also supplying fluid under pressure to said brake application pipe, an emergency valve device operated upon a reduction in brake pipe pressure for supplying fluid under pressure to operate said valve means, and a double check valve device for controlling communication through which said brake valve device and said valve means supplies fluid under pressure to said brake application pipe.

17. In a fluid pressure brake system, in combination, a brake pipe, a straight air pipe, valve means operated by fluid under pressure supplied to said straight air pipe for effecting an application of the brakes, a triple valve device operated upon a gradual reduction in brake pipe pressure for supplying fluid under pressure to said valve means and also movable to emergency position upon a sudden reduction in brake pipe pressure to supply fluid under pressure to said valve means, and a double check valve device for controlling communication through which fluid under pressure is supplied from the straight air pipe to said valve means and a communication through which said triple valve device supplies fluid under pressure to said valve means.

18. In a fluid pressure brake system, in combination, a brake pipe, a straight air pipe, valve means operated by an increase in fluid pressure in said straight air pipe for effecting an application of the brakes, a volume reservoir, a triple valve device operated upon a reduction in brake pipe pressure for supplying fluid under pressure to said valve means and to said volume reservoir, and a double check valve device for controlling communication through which fluid under pressure is supplied from the straight air pipe to said valve means and through which said triple valve device supplies fluid under pressure to said valve means.

19. In a fluid pressure brake system, in combination, a brake pipe, a control pipe, means responsive to an increase in fluid pressure in said control pipe for effecting an application of the brakes, a brake valve device for supplying fluid under pressure to said control pipe to a degree dependent upon the extent of movement of said brake valve device, and an emergency valve device controlling communication through which said brake valve device supplies fluid under pressure to said control pipe and operated upon an emergency rate of reduction in brake pipe pressure for closing said communication and for supplying fluid under pressure to said control pipe and for also effecting a local reduction in brake pipe pressure.

20. In a vehicle brake system, the combination with a brake cylinder, a control pipe and a supply reservoir, of a brake controlling valve device having a manually operated control element and operable to supply fluid under pressure to said control pipe to a degree in accordance with the degree or extent of movement of said control element, means responsive to the degree of pressure in said control pipe for effecting a supply of fluid under pressure from said supply reservoir to said brake cylinder to a corresponding degree, valve means connected to said control pipe and adapted to regulate the pressure therein, means operated according to the rate of retardation of the vehicle for actuating said valve means, a spring opposing actuation of said valve means, a brake pipe, and means operated according to reductions in brake pipe pressure for increasing the tension on said spring.

21. In a vehicle brake system, the combination with a brake cylinder, a control pipe, a straight air pipe and a supply reservoir, of means for supplying fluid under pressure to said control pipe in accordance with a desired degree of braking, electropneumatic means responsive to the pressure in said control pipe for effecting a supply of fluid under pressure from said supply reservoir to said straight air pipe, means responsive to the pressure in said straight air pipe for effecting a supply of fluid under pressure from said supply reservoir to said brake cylinder, and a cutoff valve device responsive to the pressure in said supply reservoir and operable when said pressure drops to a predetermined value for disconnecting said supply reservoir from said straight air pipe.

22. In a fluid pressure brake system, the combination with a brake cylinder, a main reservoir, and a supply reservoir, of a relay valve device operated by fluid under pressure for controlling the supply of fluid under pressure from said supply reservoir to said brake cylinder, means for supplying fluid under pressure from said main reservoir to operate said relay valve device, and a check valve device for limiting the maximum pressure of fluid supplied from said main reservoir to a value equal to or less than that supplied by said supply reservoir.

23. In a fluid pressure brake system, the combination with a brake cylinder and a brake pipe, of means responsive to a reduction in brake pipe pressure for effecting a supply of fluid under pressure to said brake cylinder, a main reservoir, means establishing a communication from said main reservoir to said brake pipe, a brake valve device in said communication and operable to close said communication only when moved to an application position, and a valve device also in said communication and adapted to hold said communication open when in release position and operable when actuated away from release position to close said communication.

24. In a vehicle brake system, the combination with a brake cylinder and a brake pipe, of means operated upon a reduction in brake pipe pressure for supplying fluid under pressure to said brake cylinder, a brake valve device for effecting reductions in brake pipe pressure at either a service rate or an emergency rate, an emergency valve device operated only upon reductions in brake pipe pressure at an emergency rate for reducing the pressure in the brake pipe to zero, an application valve device operable to reduce the pressure in the brake pipe at an emergency rate independent of operation of said brake valve device, safety means including an element adapted to be normally held depressed by an operator, and means responsive to release of pressure on said element for effecting operation of said application valve device.

25. In a braking system, in combination, a brake pipe, a brake cylinder, a reservoir, a relay valve device operated by an increase in fluid pressure for supplying fluid under pressure from the reservoir to the brake cylinder, a valve device subject to and operated upon a reduction in brake pipe pressure for supplying fluid under pressure to said relay valve device, electrically controlled valve means for supplying fluid under pressure from the reservoir to the relay valve device, and means subject to and operated by a predetermined reduction in the pressure of the fluid in said reservoir for cutting off the supply of fluid from the reservoir to the relay valve device by said electrically controlled valve means.

26. In a braking system, in combination, a brake cylinder, a reservoir, a relay valve device operated by an increase in fluid pressure for supplying fluid under pressure from the reservoir to the brake cylinder, electrically controlled valve means for supplying fluid under pressure from the reservoir to the relay valve device, and means subject to and operated by a predetermined reduction in the pressure of the fluid in said reservoir for cutting off the supply of fluid from the reservoir to the relay valve device by said electrically controlled valve means.

27. In a braking system, in combination, a brake cylinder, a reservoir, a relay valve device operated by an increase in fluid under pressure for supplying fluid under pressure to the brake cylinder, an electrically controlled valve means for supplying fluid under pressure from said reservoir to operate said relay valve device, and means operated upon a predetermined reduction in fluid pressure in said reservoir for cutting off communication through which said electrically controlled means supplies fluid under pressure to said relay valve device.

28. In a fluid pressure brake system, in combination, a normally closed valve controlling a communication through which fluid under pressure is supplied to effect an application of the brakes, a normally open valve controlling a communication through which fluid under pressure is released to effect a release of the brakes, and a movable abutment operated upon a predetermined increase in pressure for closing and holding closed said release valve and for opening and holding open said supply valve so long as said increase in pressure is maintained and operated upon a predetermined decrease in pressure for permitting opening of said release valve and closing of said supply valve.

29. In a fluid pressure brake system, in combination, means defining a chamber to which fluid under pressure is supplied in effecting an application of the brakes, a supply valve controlling communication between said chamber and a source of supply of fluid under pressure, a release valve controlling a communication through which fluid under pressure is released from said chamber, means interconnecting said two valves and operating one valve coextensively with operation of the other valve, spring means urging said supply valve toward closed position whereby said interconnecting means urges said release valve toward open position, and means operated upon a chosen increase in pressure for closing said release valve whereby said interconnecting means opens said supply valve.

30. In a fluid pressure brake system, in combination, a supply valve controlling a communication through which fluid under pressure is supplied to effect an application of the brakes, a release valve controlling a communication through which fluid under pressure is released to effect a release of the brakes, means operated upon a predetermined increase in pressure for closing and holding closed said release valve and for opening and holding open said supply valve so long as said increase in pressure is maintained, and means operated upon a decrease in pressure for effecting a supply of fluid under pressure to operate said last named means.

31. In a fluid pressure brake system, in combination, a supply valve controlling a communication through which fluid under pressure is supplied to effect an application of the brakes, a release valve controlling a communication through which fluid under pressure is released to effect a release of the brakes, fluid pressure operated means operated upon a predetermined increase in pressure for closing and holding closed said release valve and for opening and holding open said supply valve so long as said increase in pressure is maintained, a slide valve controlling a communication through which fluid under pressure is supplied to effect operation of said fluid pressure operated means, and means operated upon a decrease in pressure for shifting said slide valve to open said last mentioned communication.

32. In a fluid pressure brake system, in combination, a valve device having a chamber and being operable upon an increase of pressure in said chamber to open a communication through which fluid under pressure is supplied to effect an application of the brakes, a second valve device having a chamber and being operable upon a decrease in pressure in its chamber to effect a supply of fluid under pressure to the chamber of said first valve device, and a third valve device also having a chamber and being operable upon an increase of pressure in its chamber to diminish pressure in the chamber of said second valve device.

33. In a fluid pressure brake system, in combination, a first valve device operated upon an increase in pressure for opening a communication through which fluid under pressure is supplied to effect an application of the brakes, a second valve device having a chamber and being operable upon a decrease of pressure in said chamber to effect a supply of fluid under pressure to operate said first valve device, a valve having a charging position in which said chamber is connected to a source of supply of fluid under pressure and a venting position in which said chamber is disconnected from said source and vented to the atmosphere, a pipe normally charged with fluid under pressure, and means operated upon a decrease of pressure in said pipe for shifting said valve from said charging position to said venting position.

34. In a fluid pressure brake system, in combination, a retardation controller device for controlling applications of the brakes and having a chamber to which fluid under pressure is supplied to adjust the setting thereof, a first valve device operated upon a decrease in pressure for effecting a supply of fluid under pressure to said chamber, a pipe normally charged with fluid under pressure, and a second valve device operated upon a reduction in pressure in said normally charged pipe for effecting a decrease of pressure in said first valve device.

35. In a fluid pressure brake system, in combination, a slide valve shiftable from a release position to an application position to establish a communication through which fluid under pressure is supplied to effect an application of the brakes, a piston subject to pressure of fluid in a chamber and operated upon a decrease of pressure in said chamber to shift said slide valve from said release position to said application position, an application valve having a biased position in which said chamber is connected to a source of supply of fluid under pressure and being shiftable to an operative position in which said chamber is disconnected from said source and vented to the atmosphere, a pipe normally charged with fluid under pressure, and means operated upon a decrease of pressure in said pipe for shifting said application valve from said biased position to said operative position.

36. In a fluid pressure brake system, in combination, a first valve mechanism having a valve and a chamber and a piston operated upon a reduction of pressure in said chamber to shift said valve to application position to effect an application of the brakes, means operated upon an unintended light reduction of pressure in said chamber for preventing said piston shifting said valve to application position, a pipe normally charged with fluid under pressure, a second valve mechanism operated upon a reduction of pressure in said pipe for initiating a reduction of pressure in said chamber, and means operated following said initial reduction in pressure in said chamber to open a communication from said chamber to the atmosphere.

37. In an electropneumatic brake apparatus, in combination, a brake cylinder, a chamber, a handle movable in an application and release zone, valve means conditioned by said handle for varying the pressure of fluid in said chamber in accordance with the position of said handle in said zone, an electro-responsive means controlled by the opposing pressures of fluid in said chamber and fluid at brake cylinder pressure for supplying and releasing fluid under pressure to and from said brake cylinder and thereby varying the pressure in said brake cylinder in accordance with the position of said handle.

38. In an electropneumatic brake apparatus, in combination, a brake cylinder, electroresponsive means operative to supply and release fluid under pressure to and from said brake cylinder, switch means for controlling the operation of said electroresponsive means, means controlled by fluid at brake cylinder pressure and an opposing fluid pressure for controlling the operation of said switch means, and manually operable means movable through an application zone for varying the degree of said opposing fluid pressure in accordance with its position in said zone.

39. In an electropneumatic brake apparatus, in combination, a brake cylinder, an application magnet valve device operable to effect a supply of fluid under pressure to said brake cylinder, a release magnet valve device operative to effect a release of fluid under pressure from said brake cylinder, switch means controlled by fluid at brake cylinder pressure and an opposing fluid pressure for controlling the operation of said magnet valve devices, said switch means being operative upon a preponderance of said opposing fluid pressure to effect the operation of said application magnet valve device, and operative upon a preponderance of fluid at brake cylinder pressure to effect the operation of said release magnet valve device, and manually operable means for varying the degree of said opposing fluid pressure according to the degree or extent of operation thereof.

40. In an electropneumatic brake apparatus, in combination, a brake cylinder, electroresponsive means, an application contact operated to effect the operation of said electroresponsive means to effect a supply of fluid under pressure to said brake cylinder, a release contact operative to effect the operation of said electroresponsive means to effect a release of fluid under pressure from said brake cylinder, a self-lapping brake valve device comprising a handle and valve means conditioned by said handle to supply fluid at a pressure corresponding to the extent of movement of said handle, and means controlled by the opposing pressures supplied by said brake valve device and fluid at brake cylinder pressure for controlling said contacts and operable when the pressure supplied by the brake valve device exceeds that at brake cylinder pressure to operate said application contact to effect a supply of fluid under pressure to the brake cylinder, and operative when the fluid at brake cylinder pressure exceeds that supplied by the brake valve device to operate said release contact to effect the release of fluid under pressure from said brake cylinder.

41. In a vehicle brake system, the combination with a brake cylinder, a control pipe and a supply reservoir, of a brake controlling valve device having a manually operated control element and operable to supply fluid under pressure to said control pipe to desired degrees, means responsive to the degree of pressure in said control pipe for effecting a supply of fluid under pressure from said supply reservoir to said brake cylinder to a corresponding degree, valve means connected to said control pipe and adapted to regulate the pressure therein, means operated according to the rate of retardation of the vehicle for actuating said valve means, a spring opposing actuation of said valve means, a brake pipe, and means operated according to reductions in brake pipe pressure for increasing the tension on said spring.

42. In a two pipe straight air system, the combination of an air supply; a brake pipe; a straight air pipe; an engineer's brake valve for controlling pressure in the straight air pipe and connected with said pipe and said supply; means responsive to deceleration produced by a brake application for modulating pressure in the straight air pipe whereby a normal deceleration rate is established; adjusting means for setting the last-named means to maintain a higher deceleration rate; and means responsive to a sudden reduction of brake pipe pressure for developing a braking pressure in the straight air pipe irrespective of the action of the engineer's brake valve and for actuating said adjusting means to maintain said higher deceleration rate.

43. In a two pipe straight air system, the combination of an air supply; a brake pipe; a straight air pipe; an engineer's brake valve for controlling pressure in the straight air pipe; means responsive to deceleration produced by a brake application for modulating pressure in the straight air pipe whereby a normal deceleration rate is established; adjusting means for setting the last-named means to maintain a higher deceleration rate; and means normally effective to charge the brake pipe and responsive to a sudden reduction of pressure to suspend the supply of air to the brake pipe, isolate the brake valve from the straight air pipe and supply air to the straight air pipe independently of the brake valve, and actuate said adjusting means to maintain said higher deceleration rate.

44. In a railway train brake equipment, the combination with brake cylinders on one or more units in the train and a brake pipe, of control valve devices on one or more units in the train for controlling the supply of fluid under pressure to and its release from said brake cylinders, said control valve devices being operable electro-pneumatically or upon a reduction in brake pipe pressure, brake valve means movable to an automatic position for effecting reductions in brake pipe pressure and movable different degrees in a straight air zone for effecting electro-pneumatic operation of said control valve devices, safety means for effecting a reduction in brake pipe pressure, and means responsive to operation of said brake valve means to a chosen degree in said straight air zone for preventing operation of said safety means to effect a reduction in brake pipe pressure.

45. In a train braking apparatus, in combination, a brake cylinder, means for effecting a supply of fluid under pressure to said brake cylinder, a retardation controller device having an inertia operated element movable at a chosen rate of retardation through a given distance aaginst opposition of a yielding means, means responsive to said movement of said inertia operated element for effecting a release of fluid under pressure from said brake cylinder, a brake pipe, and means operated upon an emergency reduction in brake pipe pressure for increasing the opposition of said yielding means to movement of said inertia operated element.

46. In a vehicle brake system, in combination, means for effecting either a service application of the brakes or an emergency application of the brakes, a retardation controller mechanism having a normal adjustment and being operable to limit the rate of retardation of the vehicle according to said adjustment during service applications of the brakes, and means responsive to effecting an emergency application of the brakes for changing the adjustment of said retardation controller mechanism to limit the retardation of the vehicle to a different rate during the emergency brake application.

47. In a railway train brake equipment, in combination, brake cylinders for one or more units in a train, a brake pipe, control valve devices for one or more units in the train for controlling the supply of fluid under pressure to and its release from said brake cylinders, said control valve devices being operable electropneumatically or upon a reduction in brake pipe pressure, a brake valve device having a handle movable through one zone for effecting electropneumatic operation of said control valve devices and movable through another zone for effecting reductions in brake pipe pressure, a push button on said brake valve handle adapted to be normally held depressed by the hand of the operator, a foot valve device having a pedal adapted to be normally held depressed by the foot of an operator, and means rendered operable when pressure is released from said push button and foot pedal simultaneously for effecting an emergency reduction in brake pipe pressure to effect an emergency application of the brakes.

48. In a railway train brake system, in combination, a brake cylinder, a brake pipe, a valve device operated upon a reduction in brake pipe pressure for effecting a supply of fluid under pressure to said brake cylinder, a brake valve device having a handle for controlling applications of the brakes, a second valve device operated upon a decrease in pressure for effecting a reduction in brake pipe pressure, a foot valve device operated upon a release of foot pressure by the operator for decreasing the pressure in said second valve device, a magnet valve device operable when energized to prevent said decrease of pressure in said second valve device, and a push button on said brake valve handle for controlling energization and deenergization of said magnet valve device.

49. In a railway train brake system, in combination, a brake cylinder, a brake pipe, a straight air pipe, a control valve device operable electropneumatically to supply fluid under pressure to said brake cylinder and to said straight air pipe and operable upon a reduction in brake pipe pressure to supply fluid under pressure to said brake cylinder only, a brake valve device having a handle movable to application position to effect electropneumatic operation of said control valve device, a valve device operated upon a decrease in pressure for effecting a reduction in brake pipe pressure, a foot valve device having a foot pedal adapted to be normally held depressed by an operator, a push button on said brake valve handle also adapted to be normally held depressed by an operator, means responsive to release of pressure on said foot pedal and said push button for decreasing the pressure in said valve device to effect a reduction in brake pipe pressure, and means responsive to a predetermined pressure in said straight air pipe for preventing said decrease of pressure.

50. In a train brake system, in combination, a brake cylinder, a valve subject on one side to pressure from a supply chamber and on the other side to the combined pressure of a spring and pressure from a valve chamber, said valve controlling the supply of fluid under pressure to said brake cylinder and being normally held in seated position when the combined pressure from said valve chamber and spring overbalances the pressure from said supply chamber, a normally seated pilot valve associated with said first valve and adapted when unseated to release fluid under pressure from said valve chamber, a piston having a release position and being adapted to be operated to an application position, and a lever operated by said piston when moved to application position for effecting unseating of said pilot valve to cause said supply valve to be actuated to unseated position to effect a supply of fluid under pressure to said brake cylinder.

ELLIS E. HEWITT.